US012782697B2

(12) United States Patent
Shimomura

(10) Patent No.: US 12,782,697 B2
(45) Date of Patent: Nov. 3, 2026

(54) ZOOM LENS AND IMAGE PICKUP APPARATUS

(71) Applicant: CANON KABUSHIKI KAISHA, Tokyo (JP)

(72) Inventor: Kazuya Shimomura, Saitama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 183 days.

(21) Appl. No.: 18/926,362

(22) Filed: Oct. 25, 2024

(65) Prior Publication Data

US 2025/0164759 A1 May 22, 2025

(30) Foreign Application Priority Data

Nov. 17, 2023 (JP) ................................. 2023-195590

(51) Int. Cl.
*G02B 15/167* (2006.01)
*G02B 15/14* (2006.01)

(52) U.S. Cl.
CPC ... *G02B 15/167* (2013.01); *G02B 15/145129* (2019.08); *G02B 15/1461* (2019.08)

(58) Field of Classification Search
CPC ........ G02B 15/145129; G02B 15/1461; G02B 15/16–173; G02B 15/20–28
See application file for complete search history.

(56) References Cited

U.S. PATENT DOCUMENTS 9,264,638 B2 2/2016 Shimomura
9,268,120 B2 2/2016 Shimomura
9,310,592 B2 4/2016 Shimomura
9,329,372 B2 5/2016 Shimomura
9,400,374 B2 7/2016 Shimomura
9,678,318 B2 6/2017 Shimomura
9,716,829 B2 7/2017 Shimomura
9,904,043 B2 2/2018 Shimomura
10,078,202 B2 * 9/2018 Iwamoto ................ G02B 15/20
10,295,806 B2 5/2019 Shimomura
10,670,845 B2 6/2020 Shimomura
10,955,647 B2 3/2021 Shimomura
11,137,586 B2 10/2021 Shimomura
11,187,877 B2 * 11/2021 Yonezawa .......... G02B 15/1465
11,347,034 B2 5/2022 Shimomura
11,372,206 B2 * 6/2022 Mori ........................ G02B 9/64
11,435,564 B2 9/2022 Shimomura
(Continued)

FOREIGN PATENT DOCUMENTS

JP 2017122861 A 7/2017
JP 2020030283 A 2/2020
JP 2021015195 A 2/2021

*Primary Examiner* — Nicholas R. Pasko

(74) *Attorney, Agent, or Firm* — Carter, DeLuca & Farrell LLP

(57) ABSTRACT

A zoom lens includes a first lens unit having positive refractive power that is disposed closest to an object and does not move for magnification variation, and a second lens unit having negative refractive power that moves for magnification variation. A distance adjacent lens units changes during magnification variation. The first lens unit includes a first focus unit that moves for focusing. The zoom lens further comprises a second focus unit that is disposed on the image side of the first lens unit and moves for focusing. Predetermined inequalities are satisfied.

15 Claims, 13 Drawing Sheets

(56) References Cited

U.S. PATENT DOCUMENTS

| | | | | |
|---|---|---|---|---|
| 11,754,818 | B2 | 9/2023 | Shimomura | |
| 11,789,249 | B2 | 10/2023 | Shimomura | |
| 11,921,268 | B2 | 3/2024 | Shimomura | |
| 2015/0160444 | A1 * | 6/2015 | Koizumi ................ | G02B 15/17<br>359/688 |
| 2021/0382283 | A1 * | 12/2021 | Komiyama ........ | G02B 15/1461 |
| 2022/0260815 | A1 | 8/2022 | Shimomura | |

* cited by examiner

ZOOM LENS AND IMAGE PICKUP APPARATUS

BACKGROUND

Technical Field

The present disclosure relates to a zoom lens for an image pickup apparatus.

Description of Related Art

Image pickup apparatuses such as television cameras, movie cameras, and photo cameras are demanded to have a wide angle of view, a high zoom ratio, and high optical performance, particularly uniform resolution from the center to the periphery of the screen (image). As a zoom lens with a wide angle of view and a high zoom ratio, a positive lead type zoom lens is known that includes a first lens unit having positive refractive power disposed closest to an object and a second lens unit having negative refractive power for magnification variation disposed on the image side of the first lens unit. Japanese Patent Laid-Open No. 2021-015195 discloses a zoom lens that changes a lens unit that moves for focusing according to a focal length. Japanese Patent Laid-Open No. 2020-030283 discloses a zoom lens that includes a fixed front group, an intermediate group, and a rear group. The intermediate group and the rear group move during focusing, and a moving amount of the rear group changes according to a focal length.

SUMMARY

A zoom lens according to one aspect of the disclosure includes a first lens unit having positive refractive power that is disposed closest to an object and does not move for magnification variation, and a second lens unit having negative refractive power that moves for magnification variation. A distance adjacent lens focus unit that moves for focusing. The zoom lens further comprises a second focus unit that is disposed on the image side of the first lens unit and moves for focusing. The following inequalities are satisfied:

$$-1.7 \leq fg1/f1 \leq -1.0$$

$$0 \leq |x1w/x1t| \leq 0.50$$

$$0 \leq |x2t/x1t| \leq 025$$

where f1 is a focal length of the first lens unit, fg1 is a focal length of a lens closest to the object in the first lens unit, x1w and x1t are moving amounts for focusing from infinity to a close distance end at a wide-angle end and a telephoto end of the first focus unit, respectively, x2t is a moving amount for focusing from infinity to the close distance end at the telephoto end of the second focus unit, and a sign of each moving amount is positive when a focus unit is closer to an image plane at the close distance end than at infinity, and negative when the focus unit is closer to the object at the close distance end than at infinity. An image pickup apparatus having the above zoom lens also constitutes another aspect of the disclosure.

Further features of the disclosure will become apparent from the following description of embodiments with reference to the attached drawings.

DETAILED DESCRIPTION

Figure 1:
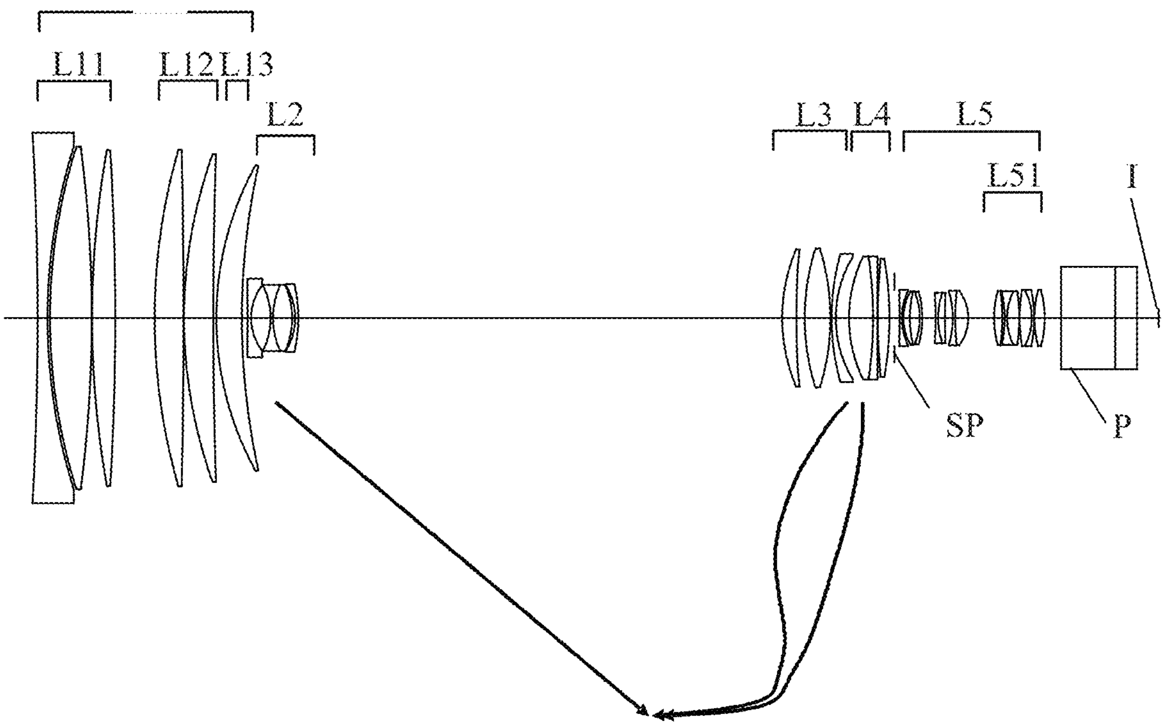
FIG. 1 is a sectional view of a zoom lens according to Example 1 (numerical example 1) at a wide-angle end in an in-focus state at infinity.

Referring now to the accompanying drawings, a description will be given of examples according to the disclosure. Before Examples 1 to 5 are described, matters common to each example will be described. The zoom lens according to each example is used for various image pickup apparatuses such as broadcasting television cameras, movie cameras, general-purpose digital still cameras, general-purpose video cameras, and film-based cameras.

In the zoom lens, a lens unit is a group of one or more lenses that move as a unit during magnification variation (zooming) between the wide-angle end and the telephoto end. That is, a difference between adjacent lens units changes during magnification variation. The lens unit may include an aperture stop (diaphragm). The wide-angle end and the telephoto end respectively indicate zoom states of a maximum angle of view (shortest focal length) and a minimum angle of view (longest focal length) when the lens unit that moves during magnification variation is located at both ends of a mechanically or controllably movable range on the optical axis. In the following description, the in-focus states on objects at infinity and the closest distance will be referred to as an in-focus state at infinity and an in-focus state at the closest distance, respectively.

The zoom lens according to each example properly sets a lens configuration and refractive power of the first lens unit and a moving amount of the focus unit to achieve high optical performance over the entire zoom range, a wide angle of view, a high zoom ratio, and a reduced size and weight.

The zoom lens according to each example includes a first lens unit having positive refractive power that is disposed closest to the object and does not move for magnification variation, and a second lens unit having negative refractive power that is disposed on the image side of the first lens unit and moves for magnification variation. The first lens unit includes a first focus unit that moves for focusing. The first lens also includes a second focus unit that is disposed on the image side of the first lens unit and moves for focusing.

x1w and x1t are moving amounts for focusing from infinity to a close distance end of the first focus unit at the wide-angle end and telephoto end, respectively, and x2t is a moving amount for focusing of the second focus unit from infinity to the close distance end at the telephoto end. A sign of each moving amount of a focus unit is positive when the focus unit is disposed closer to the image plane at the close distance end than at infinity, and negative when it is disposed closer to the object at the close distance end than at infinity. f1 is a focal length of the first lens unit, and fg1 is a focal length of a lens closest to the object in the first lens unit. Then, the zoom lens according to each example may satisfy the following inequalities:

$$-1.7 \leq fg1/f1 \leq -1.0 \quad (1)$$

$$0 \leq |x1w/x1t| \leq 0.50 \quad (2)$$

$$0 \leq |x2t/x1t| \leq 025 \quad (3)$$

The first lens unit includes a 1n-th Lens having negative refractive power and disposed closest to the object. Placing a negative lens at a position closest to the object in the first lens unit can push the entrance pupil of the zoom lens toward the object side, and suppress an increase in the lens diameter of the 1n-th lens unit as an angle of view becomes wider.

Inequality (1) defines a proper relationship between the 1n-th lens disposed closest to the object in the first lens unit and the focal length of the first lens unit. Inequality (1) is an inequality for achieving a wide angle of view, high magnification, and a reduced size of the zoom lens while satisfactorily correcting chromatic aberration at the telephoto end. In a case where fg1/f1 becomes higher than the upper limit of inequality (1), the refractive power of the 1n-th lens becomes too strong relative to the first lens unit, the higher-order aberration of the spherical aberration increases at the telephoto end, and it becomes difficult to achieve good optical performance. In a case where fg1/f1 becomes lower than the lower limit of inequality (1), the refractive power of the 1n-th lens becomes too weak relative to the first lens unit, the effect of reducing the size of the 1n-th lens unit decreases, and it becomes difficult to reduce the size of the zoom lens. In a case where the refractive power of the 1n-th lens unit is weak, the effect of correcting chromatic aberration generated by the positive lens in the first lens unit is weak, and chromatic aberration correction at the telephoto end is insufficient.

Inequality (1) may be replaced with inequality (1a) below:

$$-1.65 \leq f1n/f1 \leq -1.15 \quad (1a)$$

Inequality (1) may be replaced with inequality (1b) below:

$$-1.63 \leq f1n/f1 \leq -1.30 \quad (1b)$$

Figure 11A:
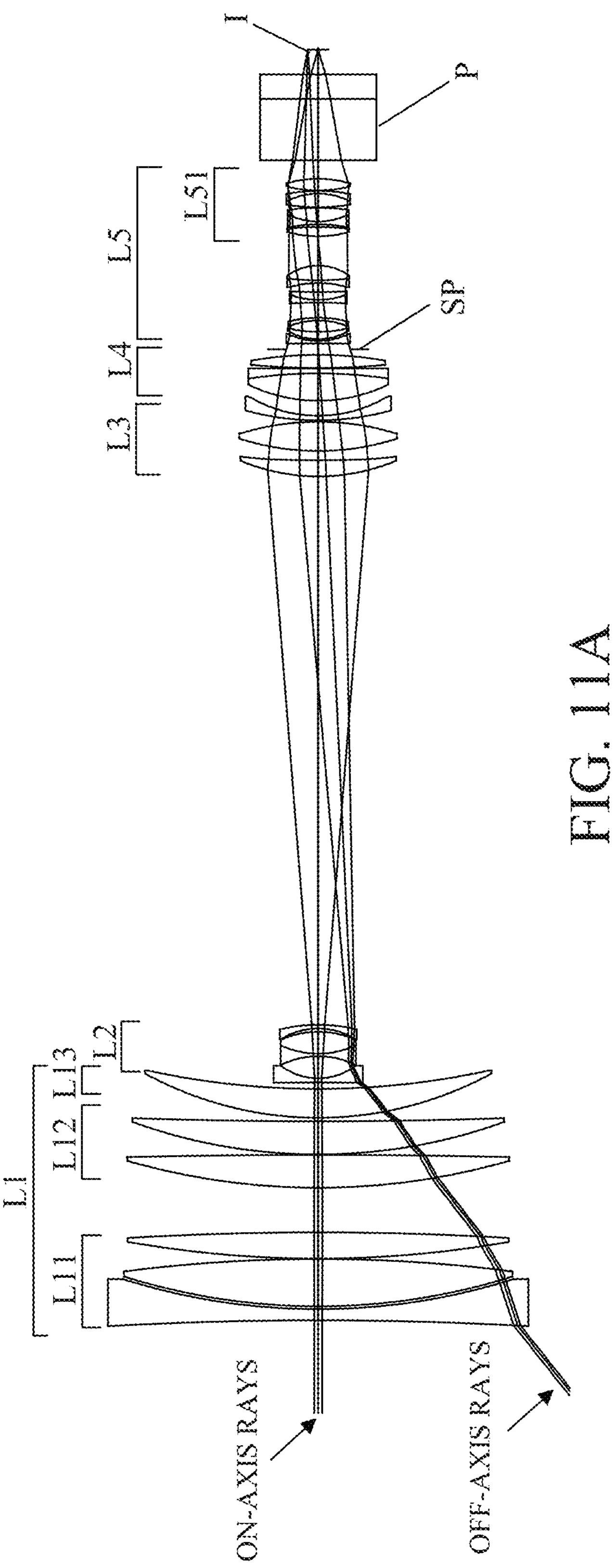
FIGS. 11A, 11B, 11C, and 11D are optical path diagrams at the wide-angle end and telephoto end in in-focus states at infinity and the closest distance of the zoom lens according to numerical example 1.
Figure 11B:
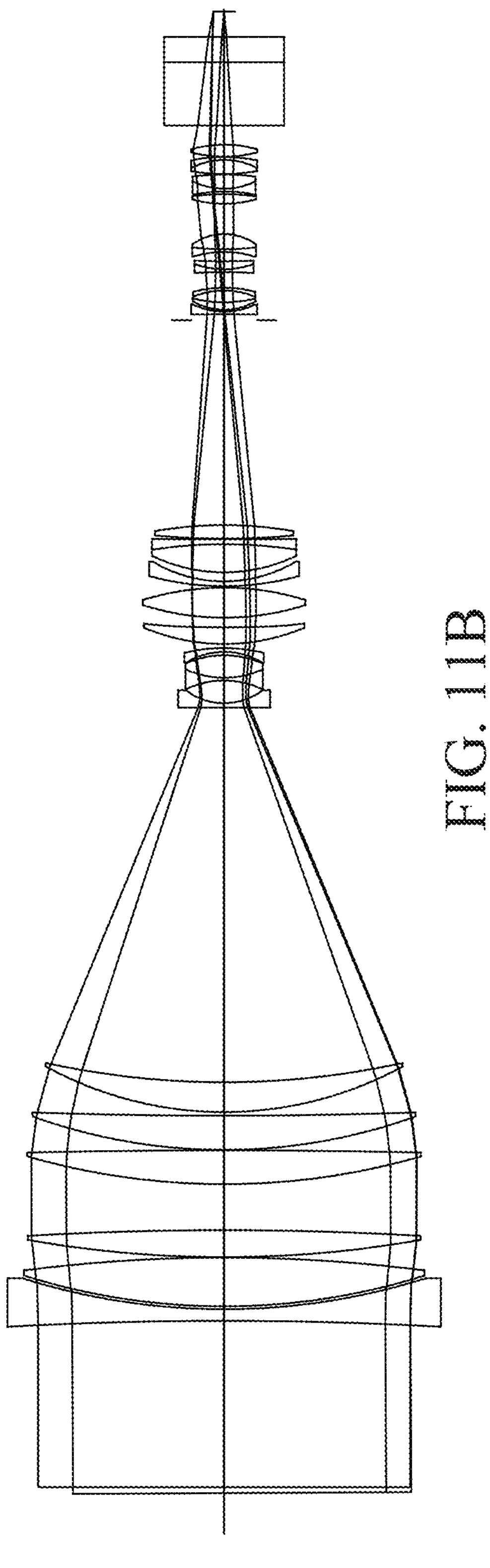
Figure 11C:
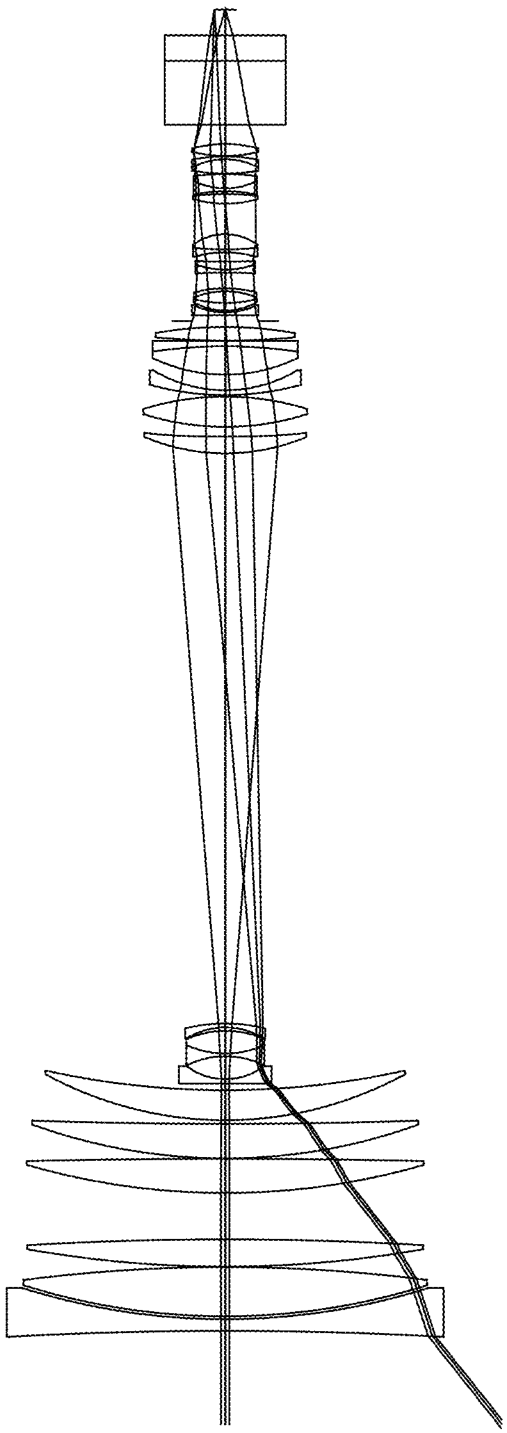
Figure 11D:
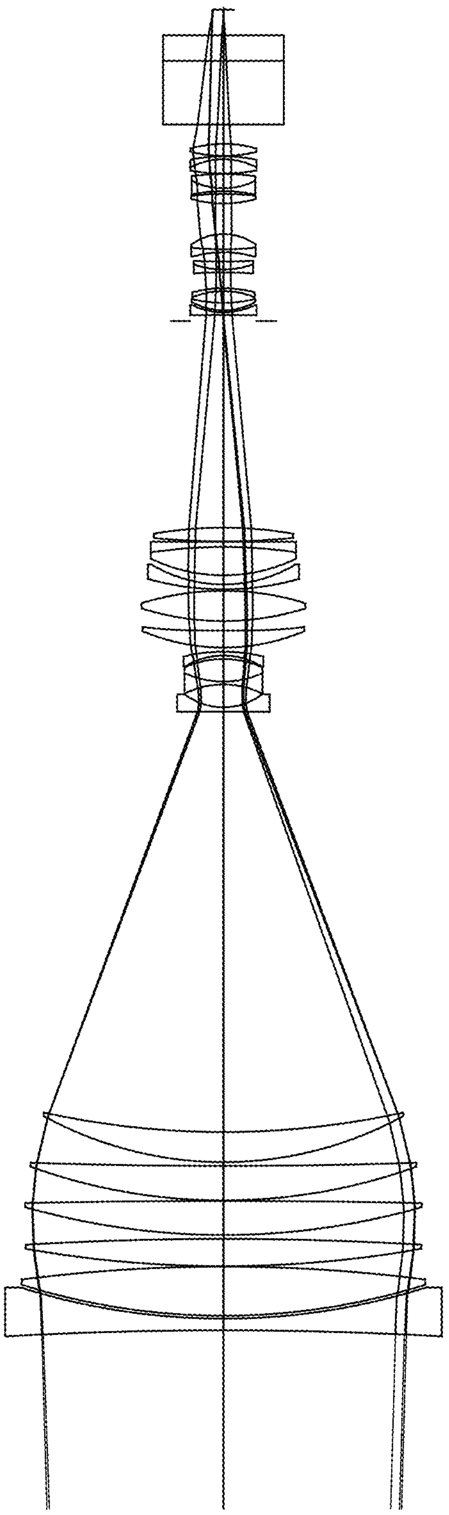

The zoom lens according to each example includes a first focus unit and a second focus unit, each of which moves during focusing. FIGS. 11A and 11B are optical path diagrams of the zoom lens according to Example 1 illustrated in FIG. 1 at the wide-angle end and telephoto end in an in-focus state at infinity, respectively, and FIGS. 11C and 11D are optical path diagrams of the zoom lens according to Example 1 at the wide-angle end and telephoto end in an in-focus state at the closest distance, respectively. Properly setting a moving amount in focusing of the second focus unit at the wide-angle end can reduce a moving amount of the first focus unit in the first lens unit. On the other hand, as understood from FIG. 11C, the lens diameter of the 1n-th lens, which has the largest lens diameter in the zoom lens, is determined by the off-axis light rays at the wide-angle end in an in-focus state at the closest distance. Reducing the moving amount of the first focus unit can suppress an increase in the lens diameter of the 1n-th lens, and can achieve a wide angle of view and a reduced size of the zoom lens. Setting the moving amount of the first focus unit to be large at the telephoto end can provide focusing when the object distance changes.

Inequalities (2) and (3) define proper moving amount ranges for focusing from infinity to a close distance end of the first and second focus units at the wide-angle end and the telephoto end, respectively. In a case where |x1w/x1t| becomes higher than the upper limit of inequality (2), a moving amount of the first focus unit at the wide-angle end increases, the lens diameter of the 1n-th lens increases, and it becomes difficult to reduce the size of the zoom lens. In a case where |x2t/x1t| becomes higher than the upper limit of inequality (3), the moving amount of the second focus unit at the telephoto end increases, the second focus unit needs a large moving space, and it becomes difficult to reduce the size of the zoom lens.

Inequalities (2) and (3) may be replaced with inequalities (2a) and (3a) below:

$$0 \leq |x1w/x1t| \leq 0.45 \quad (2a)$$

$$0 \leq |x2t/x1t| \leq 0.22 \quad (3a)$$

Inequalities (2) and (3) may be replaced with inequalities (2b) and (3b) below:

$$0 \leq |x1w/x1t| \leq 0.43 \quad (2b)$$

$$0 \leq |x2t/x1t| \leq 0.19 \quad (3b)$$

In the zoom lens having the above configuration, satisfying inequalities (1) to (3) can achieve a wide angle of view, a high zoom ratio, a reduced size and weight, and high optical performance over the entire zoom range.

The zoom lens according to each example may satisfy at least one of the following inequalities (4) to (9) and configurations.

fw and ft are focal lengths of the zoom lens at the wide-angle end and telephoto end, respectively, and x1wm is a moving amount for focusing from infinity to a close distance end of the first focus unit at a focal length fwm=fw×(ft/fw)$^{0.1}$ of the zoom lens. The following inequality may be satisfied:

$$0 \leq |x1wm/x1t| \leq 0.50 \quad (4)$$

Inequality (4) is an inequality for achieving a wide angle of view and a reduced size of the zoom lens. In a case where |x1wm/x1t| becomes higher than the upper limit of inequality (4), a moving amount of the first focus unit at the focal length fwm becomes too large, the lens diameter of the 1n-th lens increases, and it becomes difficult to reduce the size of the zoom lens.

Inequality (4) may be replaced with inequality (4a) below:

$$0 \leq |x1wm/x1t| \leq 0.40 \quad (4a)$$

Inequality (4) may be replaced with inequality (4a) below:

$$0 \leq |x1wm/x1t| \leq 0.30 \quad (4b)$$

The first focus unit may move toward the object side for focusing from infinity to a close distance end. Thereby, the number of lenses in the first focus unit can be reduced.

The following inequalities may be satisfied:

$$4.0 \leq ft/f1 \leq 6.0 \quad (5)$$

$$27 \leq f1/fw \leq 40 \quad (6)$$

where fw and ft are focal lengths of the zoom lens at the wide-angle end and telephoto end, respectively.

Inequality (5) is an inequality that allows for both size reduction of the zoom lens and good correction of longitudinal chromatic aberration while achieving high magnification. In a case where ft/f1 becomes higher than the upper limit of inequality (5), it is beneficial to miniaturization of the zoom lens, but a magnification rate of aberration generated in the first lens unit increases, and it becomes difficult to improve the optical performance at the telephoto end, especially the correction of longitudinal chromatic aberration. In a case where ft/f1 becomes lower than the lower limit of inequality (5), the refractive power of the first lens unit becomes weak, and it becomes difficult to achieve both high magnification and size reduction of the zoom lens.

Inequality (6) is an inequality for reducing the size of the zoom lens and improving peripheral performance at the wide-angle end. In a case where f1/fw becomes higher than the upper limit of inequality (6), the refractive power of the first lens unit becomes weak, and it becomes difficult to achieve both high magnification and size reduction of the zoom lens. In a case where f1/fw becomes lower than the lower limit of inequality (6), the refractive power of the first lens unit becomes stronger, it becomes difficult to correct the curvature of field and distortion at the wide-angle end.

Inequalities (5) and (6) may be replaced with inequalities (5a) and (6a) below:

$$4.1 \leq ft/f1 \leq 5.0 \quad (5a)$$

$$28 \leq f1/fw \leq 37 \quad (6a)$$

Inequalities (5) and (6) may be replaced with inequalities (5b) and (6b) below:

$$4.2 \leq ft/f1 \leq 4.5 \quad (5b)$$

$$29 \leq f1/fw \leq 35 \quad (6b)$$

The lens closest to the object in the first lens unit may be a biconcave lens. Thereby, the 1n-th lens can have proper refractive power without making the radius of curvature on the image side of the 1n-th Lens too small.

The zoom lens may include a final lens unit closest to the image plane that does not move for magnification variation, and the second focus unit may be part of the final lens unit. The final lens unit may have an extender unit that can be inserted into and removed from space in the final lens unit to change the focal length range of the zoom lens to the long focal length side. The focal length at the telephoto end can be extended by inserting the extender unit to change the focal length range of the zoom lens to the long focal length side.

The following inequality may be satisfied:

$$0 \leq |\beta f2w| \leq 0.5 \quad (7)$$

where βf2w is a lateral magnification of the second focus unit at the wide-angle end in an in-focus state at infinity.

Inequality (7) defines a proper range of a focus change amount per unit moving amount of the second focus unit. In a case where |βf2w| becomes higher than the upper limit of inequality (7), a focus change amount per unit moving amount of the second focus unit becomes too small, so the moving amount of the second focus unit increases, and it becomes difficult to reduce the size of the zoom lens.

Inequality (7) may be replaced with inequality (7a) below:

$$0 \leq |\beta f2w| \leq 0.4 \quad (7a)$$

Inequality (7) may be replaced with inequality (7b) below:

$$0 \leq |\beta f2w| \leq 0.35 \quad (7b)$$

The zoom lens according to each example may include, in order from the object side to the image side, the first lens unit, the second lens unit, a third lens unit having positive refractive power that moves to the object side for magnification variation, and a fourth lens unit having positive refractive power. In that case, the following inequality may be satisfied:

$$-0.50 \le f2/f34 \le -0.15 \quad (8)$$

where f34 is a combined focal length of the third and fourth lens units at the wide-angle end. Inequality (8) is an inequality for achieving both size reduction of the zoom lens and good aberration correction over the entire zoom range. In a case where f2/f34 becomes higher than the upper limit of inequality (8), the refractive powers of the third and fourth lens units become weak, so the moving amounts of the third and fourth lens units for magnification variation become large, and it becomes difficult to reduce the size of the zoom lens. In a case where f2/f34 becomes lower than the lower limit of inequality (8), the refractive powers of the third and fourth lens units become strong, and it becomes difficult to effectively correct aberrations in an intermediate zoom range.

Inequality (8) may be replaced with inequality (8a) below:

$$-0.40 \le f2/f34 \le -0.20 \quad (8a)$$

Inequality (8) may be replaced with inequality (8b) below:

$$-0.35 \le f2/f34 \le -0.25 \quad (8b)$$

The following inequality may be satisfied:

$$-15.0 \le f1/f2 \le -8.0 \quad (9)$$

where f2 is a focal length of the second lens unit:

Inequality (9) is an inequality for achieving both size reduction of the zoom lens and good aberration correction over the entire zoom range. In a case where f1/f2 becomes higher than the upper limit of inequality (9), the refractive power of the second lens unit becomes weak, and it becomes difficult to reduce the size of the zoom lens. In a case where f1/f2 becomes lower than the lower limit of inequality (9), the refractive power of the second lens unit becomes strong, it becomes difficult to properly correct aberrations, particularly from an intermediate zoom range to the telephoto end.

Inequality (9) may be replaced with inequality (9a) below:

$$-13.0 \le f1/f2 \le -9.0 \quad (9a)$$

Inequality (9) may be replaced with inequality (9b) below:

$$-12.0 \le f1/f2 \le -10.0 \quad (9b)$$

The first focus unit may include a plurality of sub-lens units that move independently of each other during focusing from infinity to a close distance end. Thereby, the variations of spherical aberration and the like caused by the focusing can be effectively corrected.

A protection filter may be disposed on the object side of the first lens unit. The protection filter may be a lens. In a case where the following inequality may be satisfied:

$$|f1/ff| \le 1.0\times10^{-4} \quad (10)$$

where ff is a focal length of the protection filter as a lens, the protection filter is not included in the first lens unit.

The specific configurations of the zoom lenses according to Examples 1 to 5 will be described below. After Example 5, numerical examples 1 to 5 corresponding to Examples 1 to 5, respectively, will be described.

In each numerical example, a surface number i indicates the order of the surface when counted from the object side. r represents a radius of curvature (mm) of an i-th surface from the object side, d represents a lens thickness or air gap (mm) on the optical axis between i-th and (i+1)-th surfaces, and nd represents a refractive index for the d-line of the optical material between the i-th and (i+1)-th surfaces. νd represents an Abbe number based on the d-line of the optical material between the i-th and (i+1)-th surfaces. The Abbe number νd based on the d-line is expressed as:

$$\nu d = (Nd - 1)/(NF - NC)$$

where Nd, NF, and NC are refractive indices for the d-line (587.6 nm), F-line (486.1 nm), and C-line (656.3 nm) in the Fraunhofer lines. θgF is a partial dispersion ratio regarding the g-line and F-line, and is expressed as:

$$\theta gF = (Ng - NF)/(NF - NC)$$

where Ng is a refractive index for the g-line (wavelength 435.8 nm). An effective diameter is a radius (mm) of an area in the i-th lens surface through which light rays that contribute to imaging pass.

A focal length is a focal length (mm) of the entire zoom lens system. BF stands for back focus (mm). The back focus is a distance on the optical axis from a final surface of the zoom lens (the lens surface closest to the image plane) to a paraxial image plane, expressed in air equivalent length. An overall lens length is a distance on the optical axis from the foremost surface of the zoom lens (the lens surface closest to the object) to the final surface plus the back focus. EnPP represents an entrance pupil position, ExPP represents an exit pupil position, FPPP represents a front principal-point position, and RPPP represents a rear principal-point position.

In lens unit data, LU represents a lens unit, SS represents a starting surface, FL represents a focal length, LCL represents a lens configuration length, FPPP represents a front principal-point position, and RPPP represents a rear principal-point position.

An asterisk "*" next to a surface number means that the surface has an aspherical shape. The aspherical shape is expressed by the following expression:

$$X = \frac{H^2/R}{1+\sqrt{1-(1+k)(H/R)^2}} + A4H^4 + A6H^6 + A8H^8 + A10H^{10} + A12H^{12} + A14H^{14} + A16H^{16} + A3H^3 + A5H^5 + A7H^7 + A9H^9 + A11H^{11} + A13H^{13} + A15H^{15}$$

where X is a displacement amount from a surface vertex in the optical axis direction, H is a height from the optical axis in a direction perpendicular to the optical axis, a light traveling direction is positive, R is a paraxial radius of curvature, k is a conic constant, and A4 to A16 are aspherical coefficients.

"e±Z" in the conic constant and aspheric coefficient means "x10$^{\pm Z}$."

Examples 1 to 4

Figure 3:
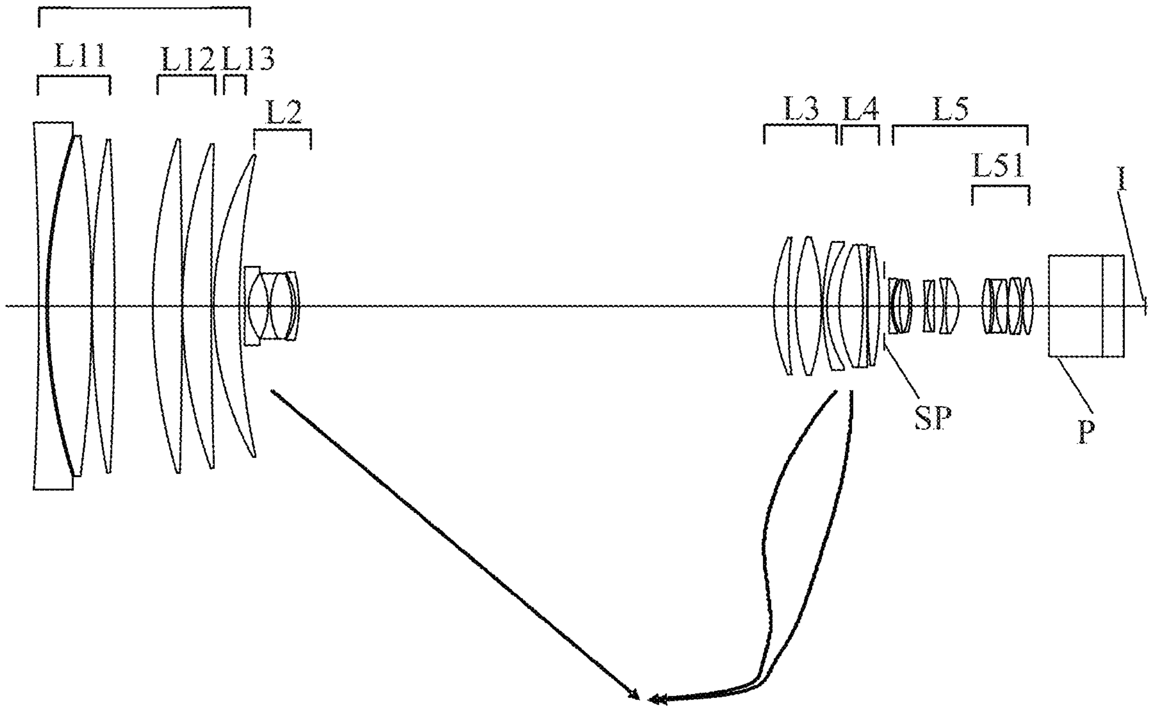
FIG. 3 is a sectional view of a zoom lens according to Example 2 (numerical example 2) at a wide-angle end in an in-focus state at infinity.
Figure 5:
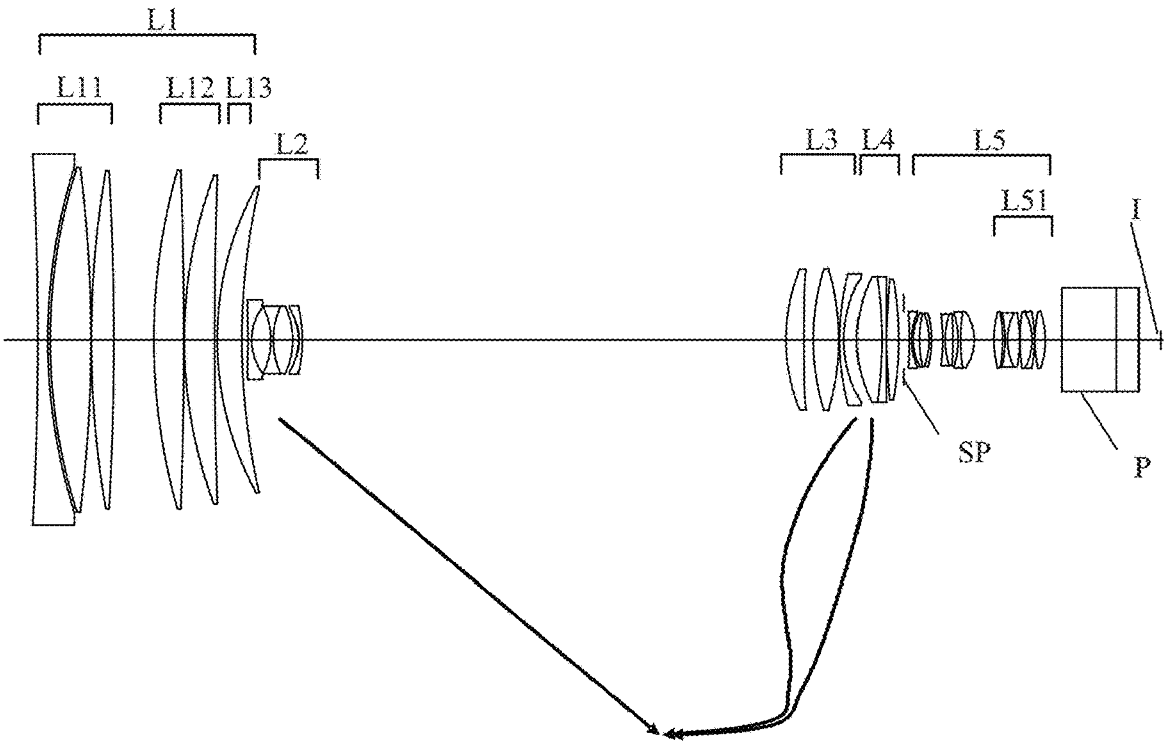
FIG. 5 is a sectional view of a zoom lens according to Example 3 (numerical example 3) at a wide-angle end in an in-focus state at infinity.
Figure 7:
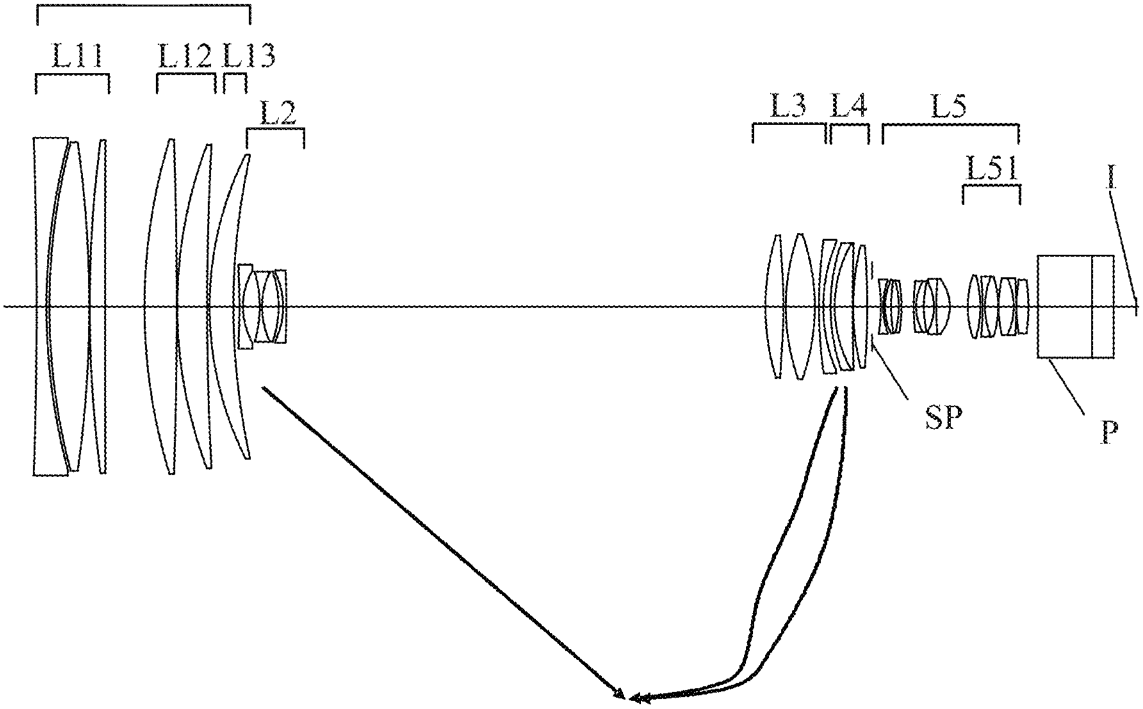
FIG. 7 is a sectional view of a zoom lens according to Example 4 (numerical example 4) at a wide-angle end in an in-focus state at infinity.

FIG. 1 illustrates a section of a zoom lens according to Example 1 (numerical example 1) at a wide-angle end in an in-focus state at infinity. FIG. 3 illustrates a section of a zoom lens according to Example 2 (numerical example 2) at a wide-angle end in an in-focus state at infinity. FIG. 5 illustrates a section of a zoom lens according to Example 3 (numerical example 3) at a wide-angle end in an in-focus state at infinity. FIG. 7 illustrates a section of a zoom lens according to Example 4 (numerical example 4) at a wide-angle end in an in-focus state at infinity. Below a lens unit that moves during the magnification variation of the zoom lens according to each example, a moving locus of the lens unit during the magnification variation from the wide-angle end to the telephoto end is illustrated.

Each of the zoom lenses according to Examples 1 to 4 includes, in order from the object side (left side of the figure) to the image side, a first lens unit L1 having positive refractive power that does not move for magnification variation, and a second lens unit L2 having negative refractive power that moves to the image side for magnification variation from the wide-angle end to the telephoto end. As described later, a part of the first lens unit L1 moves for focusing. The zoom lenses according to Examples 1 to 4 further include a third lens unit L3 having positive refractive power that moves to the object side for magnification variation from the wide-angle end to the telephoto end, and a fourth lens unit L4 having positive refractive power that moves to the object side during magnification variation from the wide-angle end to the telephoto end to correct image plane variation associated with magnification variation. The third lens unit L3 of the zoom lenses according to Examples 1 to 3 also moves to the image side during magnification variation from the wide-angle end to the telephoto end. Each of the zoom lenses according to Examples 1 to 4 further includes a fifth lens unit L5 having positive refractive power as the final lens unit, which does not move for magnification variation and has an imaging function.

In Examples 1 to 4, the second lens unit L2, the third lens unit L3, and the fourth lens unit L4 form a magnification varying system. SP is an aperture stop, and is disposed between the fourth lens unit L4 and the fifth lens unit L5. The aperture stop SP does not move during magnification variation. P is a glass block such as a color separation prism or an optical filter. I is an image plane. An imaging surface (light receiving surface) of an image sensor as a photoelectric conversion element, a film surface (photosensitive surface) of a silver film, or the like is disposed in an image plane I.

In Examples 1 to 4, the first lens unit L1 has the first surface to the twelfth surface. The second lens unit L2 has the thirteenth surface to the nineteenth surface. The third lens unit L3 has the twentieth surface to the twenty-fifth surface. The fourth lens unit L4 has the twenty-sixth surface to the thirtieth surface. The aperture stop SP is the thirty-first surface. The fifth lens unit L5 has the thirty-second surface to the fifty-third surface.

The first lens unit L1 includes a first sub-lens unit L11 that does not move for focusing, a second sub-lens unit L12 having positive refractive power, and a third sub-lens unit L13 having positive refractive power. The second sub-lens unit L12 and the third sub-lens unit L13 move for focusing from the infinity side to a close distance side. The first sub-lens unit L11 has the first surface to the sixth surface. The second sub-lens unit L12 includes the seventh surface to the tenth surface. The third sub-lens unit L13 includes the eleventh surface to the twelfth surface.

The fifth lens unit L5 includes a fourth sub-lens unit L51 having positive refractive power that moves for focusing. The fourth sub-lens unit L51 has the forty-fourth to fifty-third surfaces. The extender unit can be inserted into and removed from the space formed by retracting the thirty-eighth to forty-third surfaces inside the fifth lens unit L5.

In Examples 1 to 4, the second sub-lens unit L12 and the third sub-lens unit L13 in the first lens unit L1 correspond to the first focus unit, and the fourth sub-lens unit L51 in the fifth lens unit L5 corresponds to the second focus unit.

Table 1 summarizes values of inequalities (1) to (9) in numerical examples 1 to 4. Numerical examples 1 to 3 satisfy inequalities (1) to (9), and properly set the lens configuration, refractive power, and moving amount during focusing of the first lens unit L1. Thereby, the zoom lens according to numerical example 1 has a wide angle of view, a high zoom ratio, a reduced size and weight, and high optical performance over the entire zoom range.

Figure 2A:
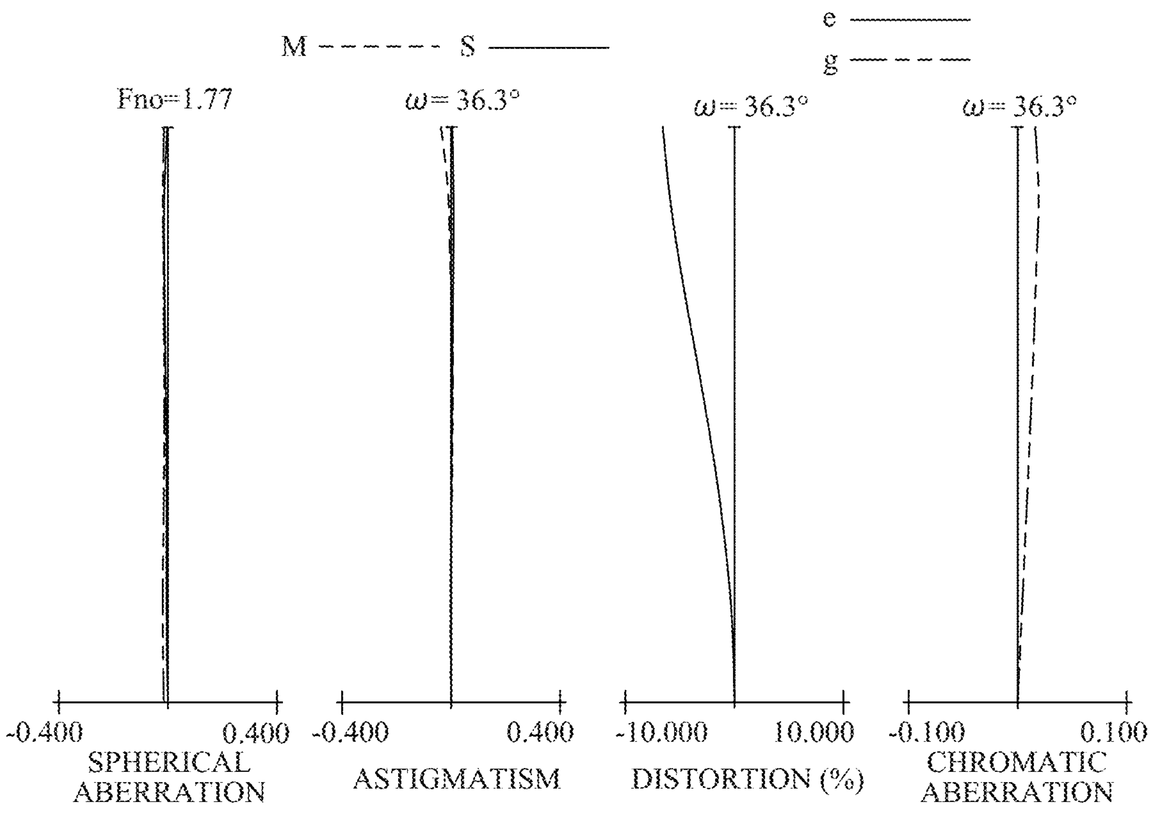
FIGS. 2A, 2B, and 2C are aberration diagrams at a wide-angle end, an intermediate zoom position, and a telephoto end in an in-focus state at infinity of the zoom lens according to numerical example 1.
Figure 2B:
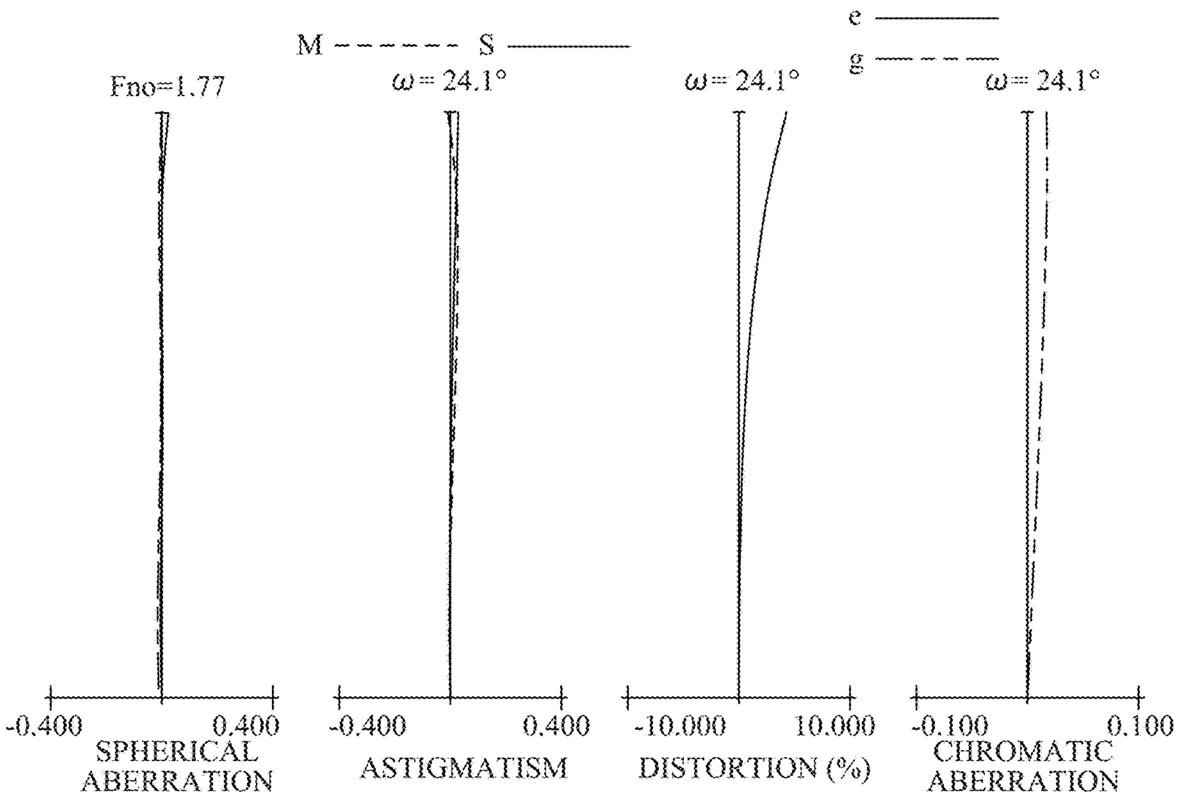
Figure 2C:
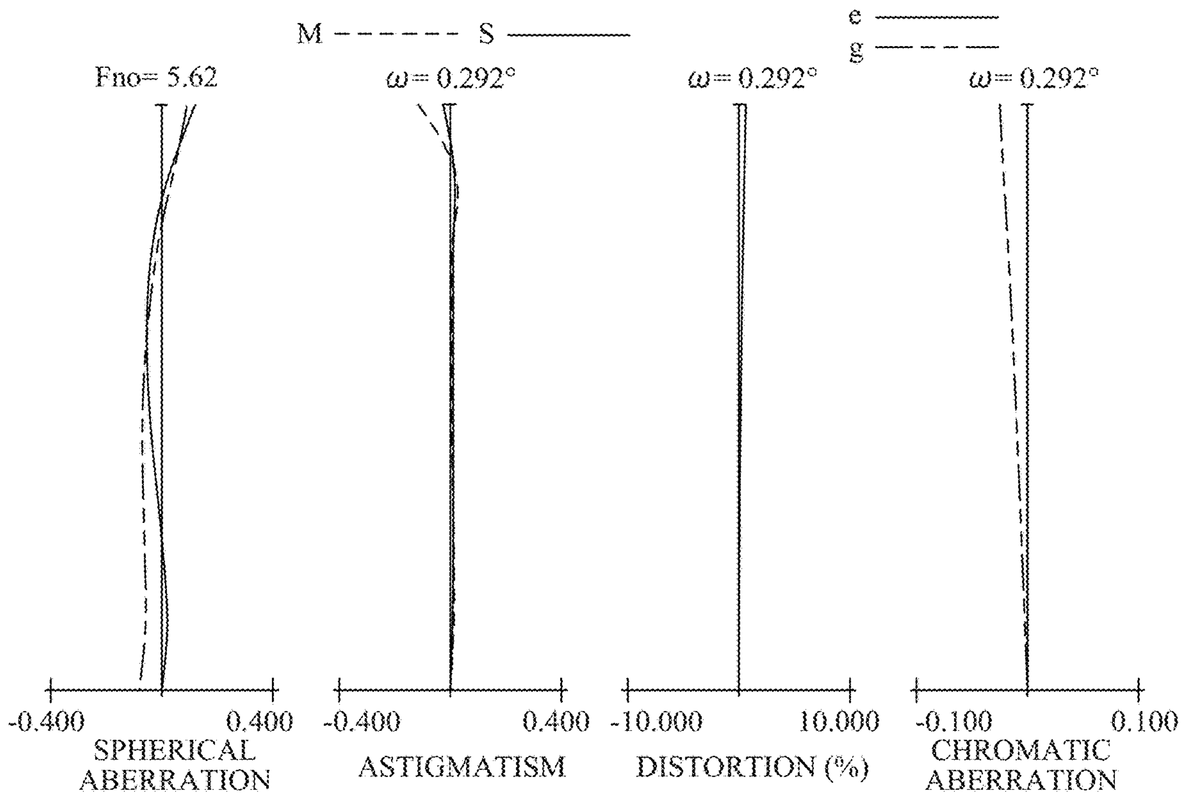
Figure 4A:
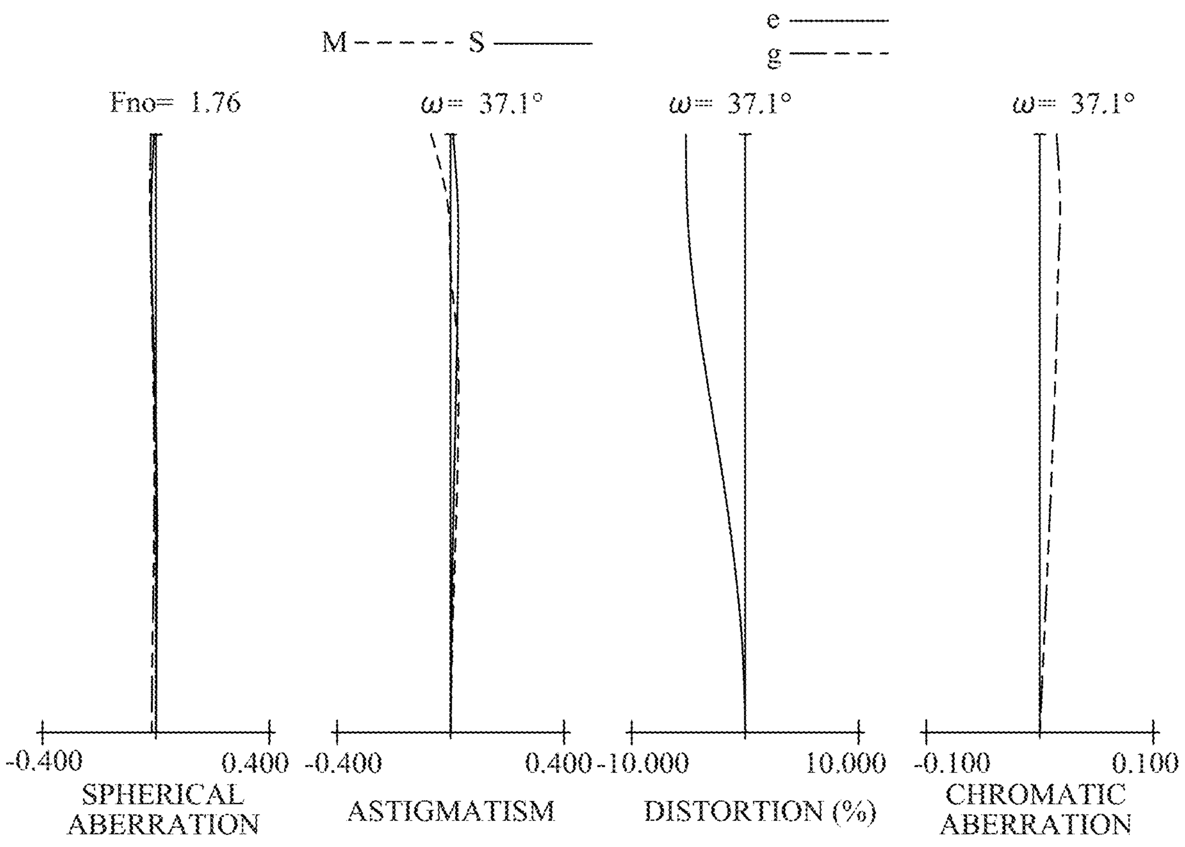
FIGS. 4A, 4B, and 4C are aberration diagrams at a wide-angle end, an intermediate zoom position, and a telephoto end in an in-focus state at infinity of the zoom lens according to numerical example 2.
Figure 4B:
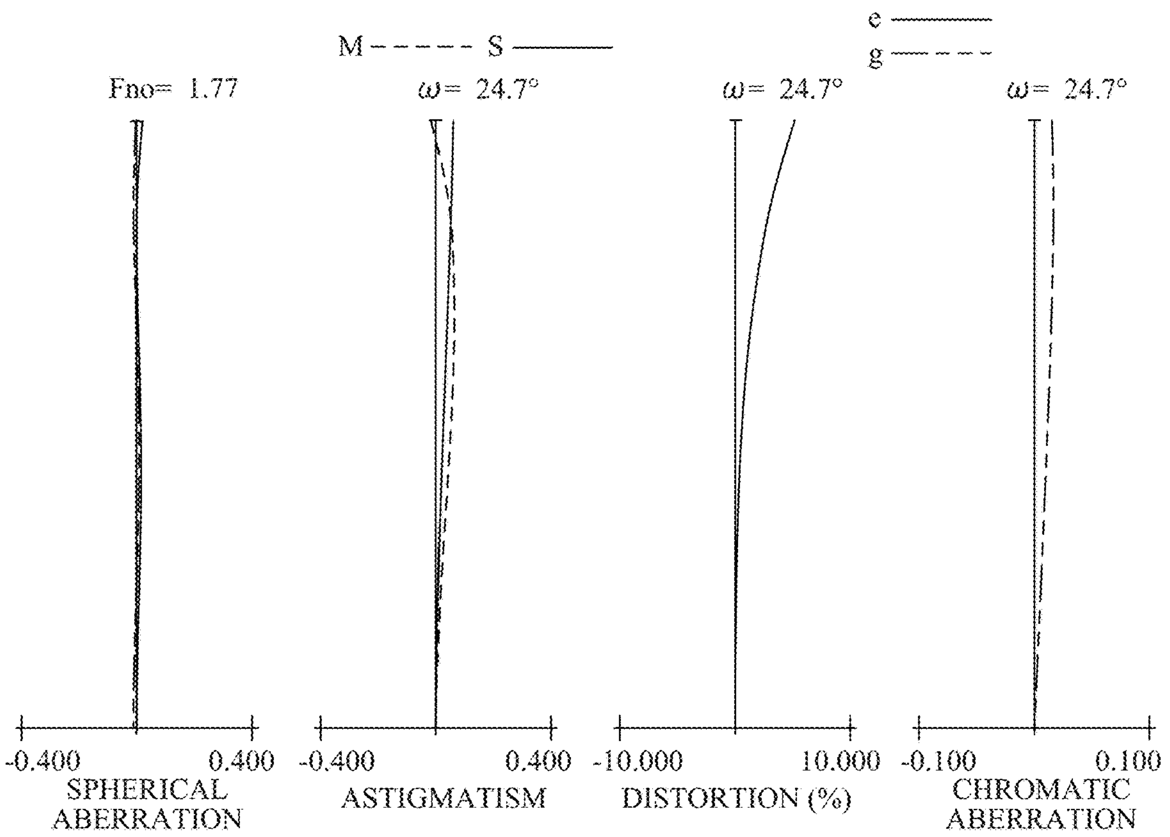
Figure 4C:
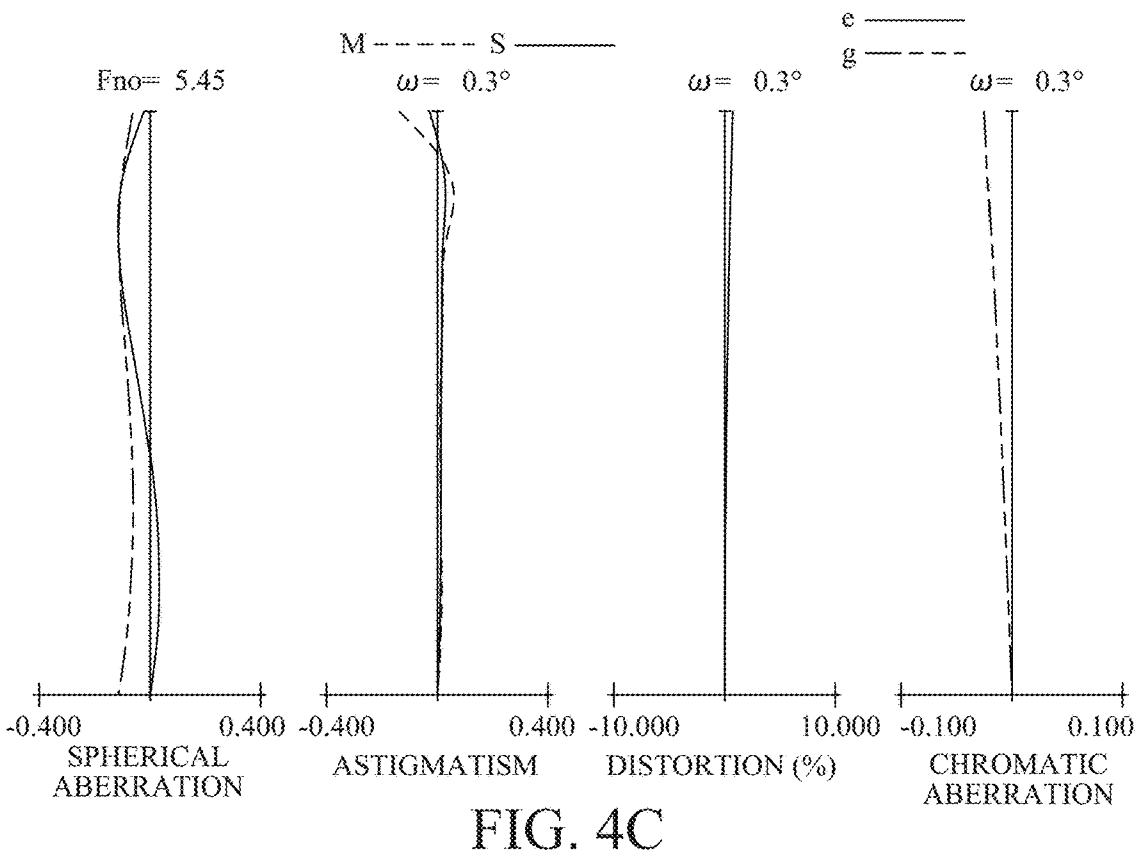
Figure 6A:
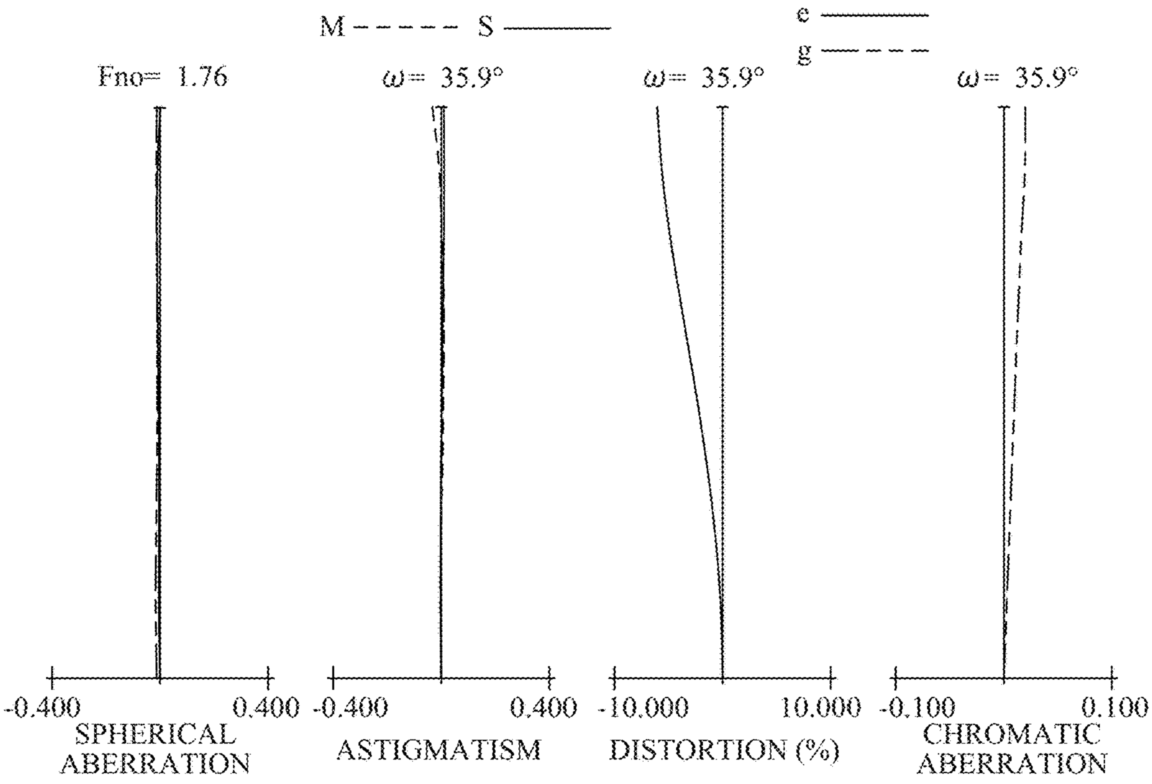
FIGS. 6A, 6B, and 6C are aberration diagrams at a wide-angle end, an intermediate zoom position, and a telephoto end in an in-focus state at infinity of the zoom lens according to numerical example 3.
Figure 6B:
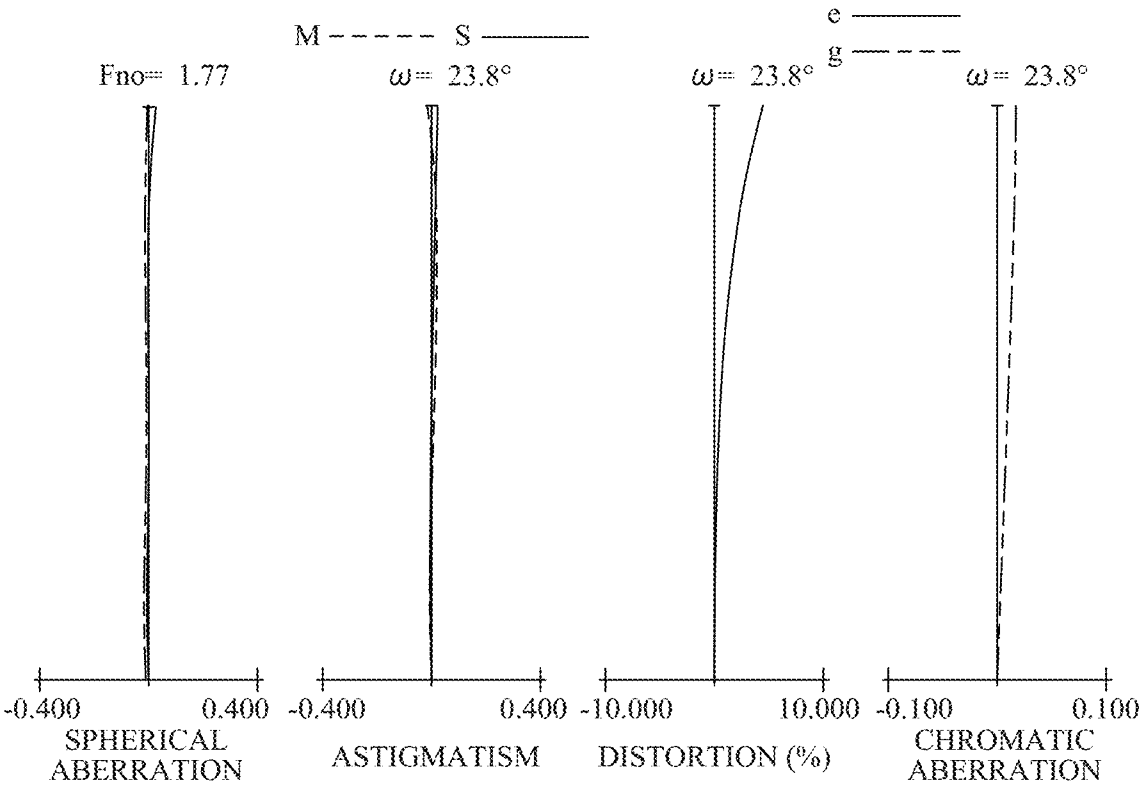
Figure 6C:
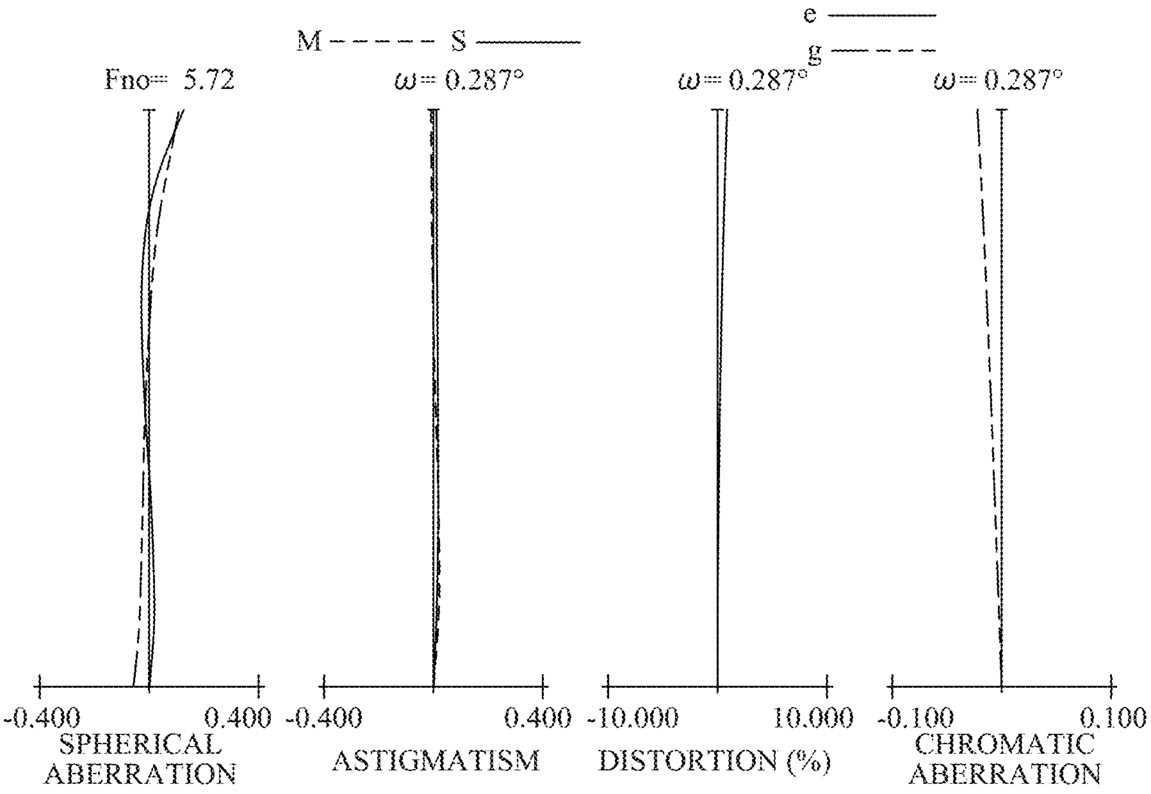
Figure 8A:
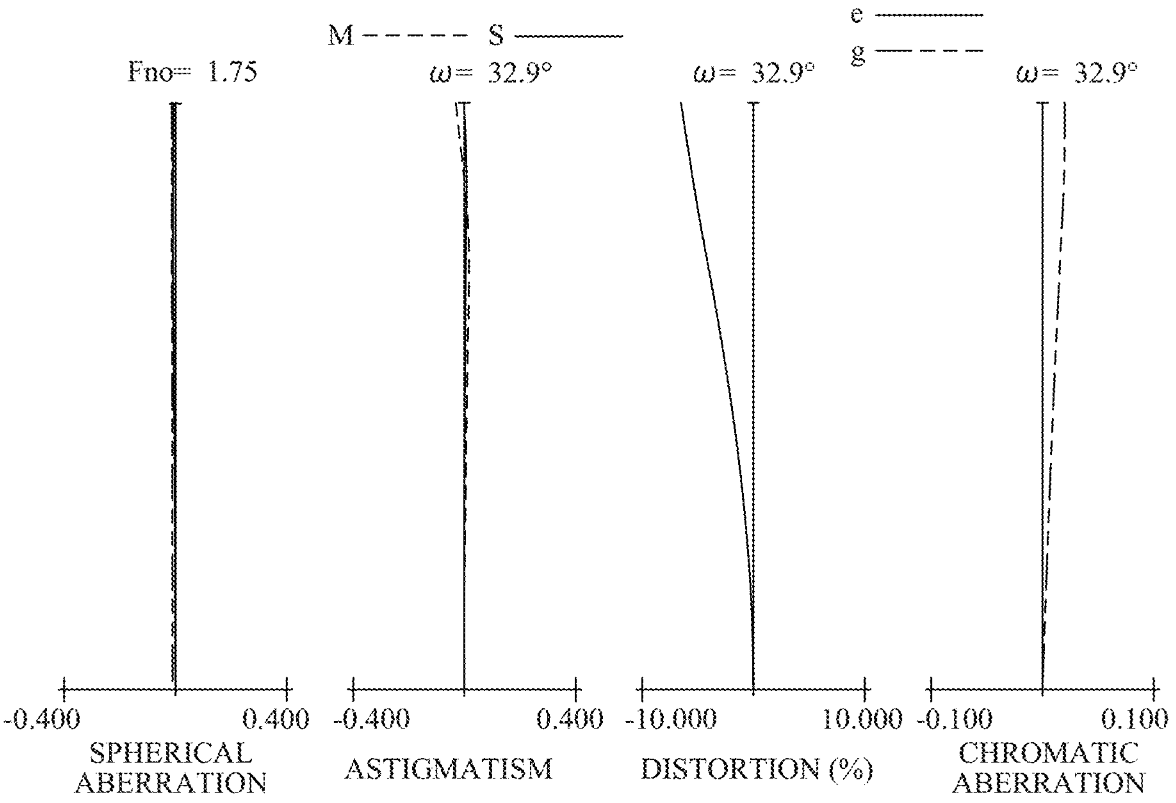
FIGS. 8A, 8B, and 8C are aberration diagrams at a wide-angle end, an intermediate zoom position, and a telephoto end in an in-focus state at infinity of the zoom lens according to numerical example 4.
Figure 8B:
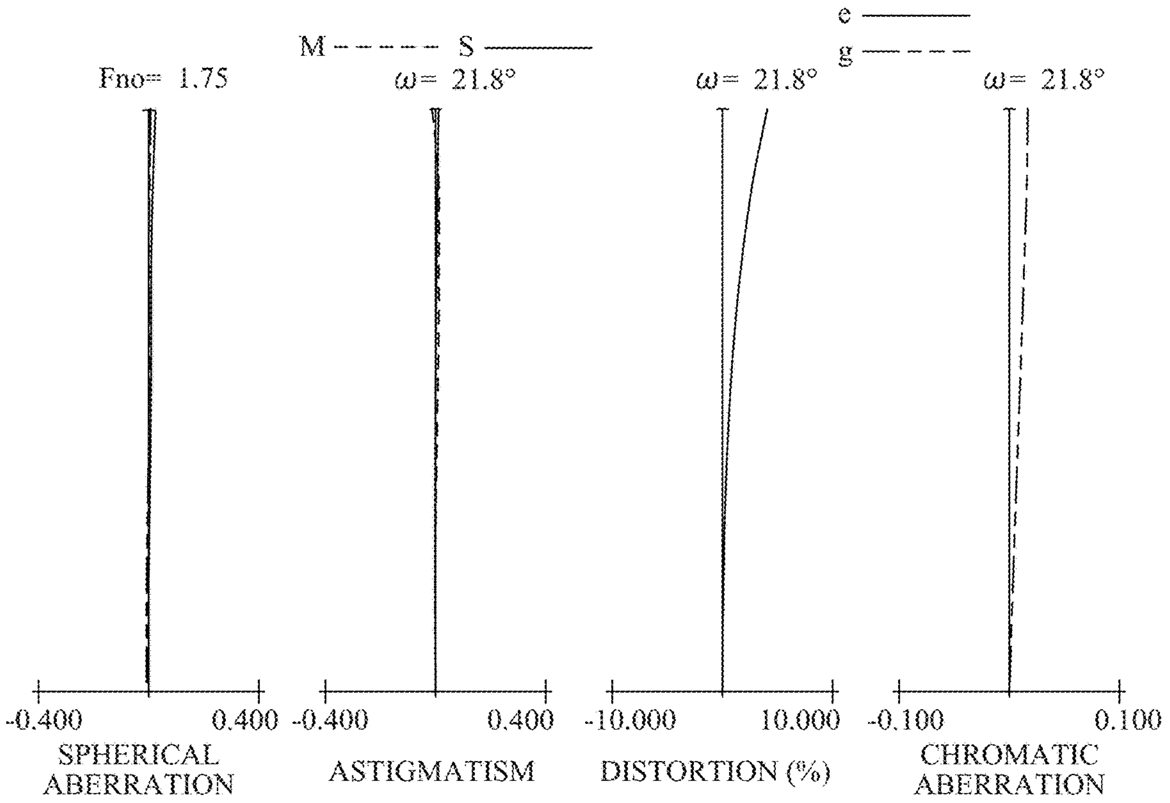
Figure 8C:
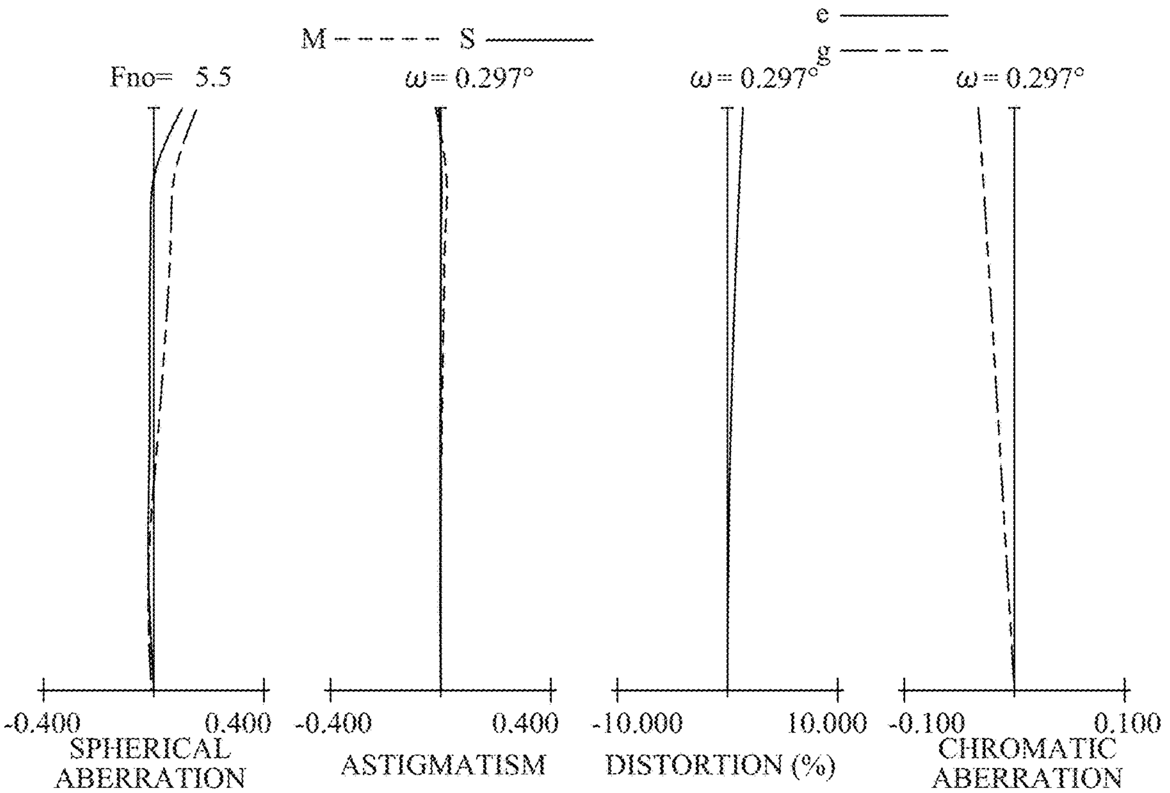

FIGS. 2A, 2B, and 2C are longitudinal aberration (spherical aberration, astigmatism, distortion, and chromatic aberration) diagrams of the zoom lens according to numerical example 1 at a wide-angle end, a focal length 12.3 mm, and a telephoto end, respectively, in an in-focus state at infinity. FIGS. 4A, 4B, and 4C are longitudinal aberration diagrams of the zoom lens according to numerical example 2 at a wide-angle end, a focal length 12.0 mm, and a telephoto end, respectively, in an in-focus state at infinity. FIGS. 6A, 6B, and 6C are longitudinal aberration diagrams of the zoom lens according to numerical example 3 at a wide-angle end, a focal length 12.5 mm, and a telephoto end, respectively, in an in-focus state at infinity. FIGS. 8A, 8B, and 8C illustrate longitudinal aberration diagrams of the zoom lens according to numerical example 4 at a wide-angle end, a focal length 13.8 mm, and a telephoto end, respectively, in an in-focus state at infinity.

In the spherical aberration diagram, Fno indicates an F-number. A solid line indicates a spherical aberration amount for the e-line (wavelength 546.1 nm), and an alternate long and two short dashes line indicates a spherical aberration amount for the g-line (wavelength 435.8 nm). In the astigmatism diagram, a solid line S indicates an astigmatism amount in a sagittal image plane, and a dashed line M indicates an astigmatism amount in a meridional image plane. The distortion diagram illustrates a distortion amount for the e-line. The chromatic aberration diagram illustrates a lateral chromatic aberration amount for the g-line. ω represents a half angle of view (°). Each scale ranges −0.400 mm to +0.400 mm for spherical aberration, −0.400 mm to +0.400 mm for astigmatism, −10.000% to +10.000% for distortion, and −0.100 mm to +0.100 mm for lateral chromatic aberration.

Example 5

Figure 9:
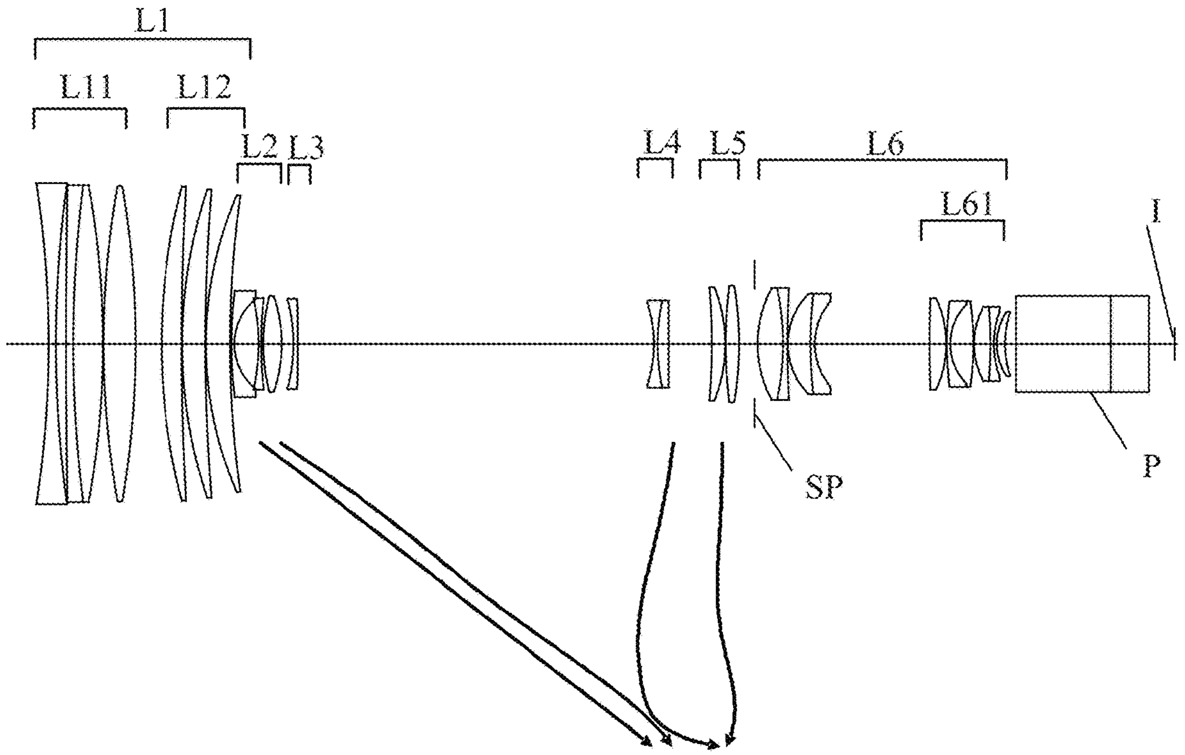
FIG. 9 is a sectional view of a zoom lens according to Example 5 (numerical example 5) at a wide-angle end in an in-focus state at infinity.

FIG. 9 illustrates a section of the zoom lens according to Example 5 (numerical example 5) at a wide-angle end in an in-focus state at infinity.

The zoom lens according to Example 5 includes, in order from the object side, a first lens unit L1 having positive refractive power that does not move for magnification variation, and a second lens unit L2 having negative refractive power that moves to the image side for magnification variation from the wide-angle end to the telephoto end. As will be described later, a part of the first lens unit L1 moves for focusing. The zoom lens according to Example 5 further includes a third lens unit L3 having negative refractive power that moves to the image side for magnification variation from the wide-angle end to the telephoto end, a fourth lens unit L4 having negative refractive power that moves to the object side and then to the image side for magnification variation from the wide-angle end to the telephoto end, a fifth lens unit L5 having positive refractive power that moves to the object side and the image side during magnification variation from the wide-angle end to the telephoto end to correct image plane fluctuations associated with magnification variation, and a sixth lens unit L6 as a final lens unit having positive refractive power that does not move for magnification variation and has an imaging function.

In this example, the second lens unit L2, the third lens unit L3, the fourth lens unit L4, and the fifth lens unit L5 constitute a magnification varying system. The aperture stop SP is disposed between the fifth lens unit L5 and the sixth lens unit L6, and does not move during magnification variation.

The first lens unit L1 has the first to thirteenth surfaces. The second lens unit L2 has the fourteenth to nineteenth surfaces. The third lens unit L3 has the twentieth and twenty-first surfaces. The fourth lens unit L4 has the twenty-second to twenty-fourth surfaces. The fifth lens unit L5 has the twenty-fifth to twenty-eighth surfaces. The aperture stop SP has the twenty-ninth surface. The sixth lens unit L6 has the thirtieth to forty-fifth surfaces.

The first lens unit L1 includes a first sub-lens unit L11 that does not move for focusing, and a second sub-lens unit L12 having positive refractive power that moves for focusing from the infinity side to a close distance side. The first sub-lens unit L11 has the first surface to the seventh surface. The second sub-lens unit L12 includes the eighth surface to the thirteenth surface.

The sixth lens unit L6 includes a third sub-lens unit L61 having positive refractive power that moves for focusing. The third sub-lens unit L61 includes the thirty-sixth surface to the forty-fifth surface. The extender unit can be inserted into and removed from the space between the thirty-fifth surface and the thirty-sixth surface inside the sixth lens unit L6.

In this example, the second sub-lens unit L12 in the first lens unit L1 corresponds to the first focus unit, and the third sub-lens unit L61 in the sixth lens unit L6 corresponds to the second focus unit.

Table 1 summarizes values of inequalities (1) to (9) in numerical example 5. Numerical example 5 satisfies inequalities (1) to (4) and inequality (7) except for inequalities (5), (6), (8), and (9), and properly set the lens configuration, refractive power, and moving amount during focusing of the first lens unit L1. Thereby, the zoom lens according to numerical example 5 has a wide angle of view, a high zoom ratio, a reduced size and weight, and high optical performance over the entire zoom range.

Figure 10A:
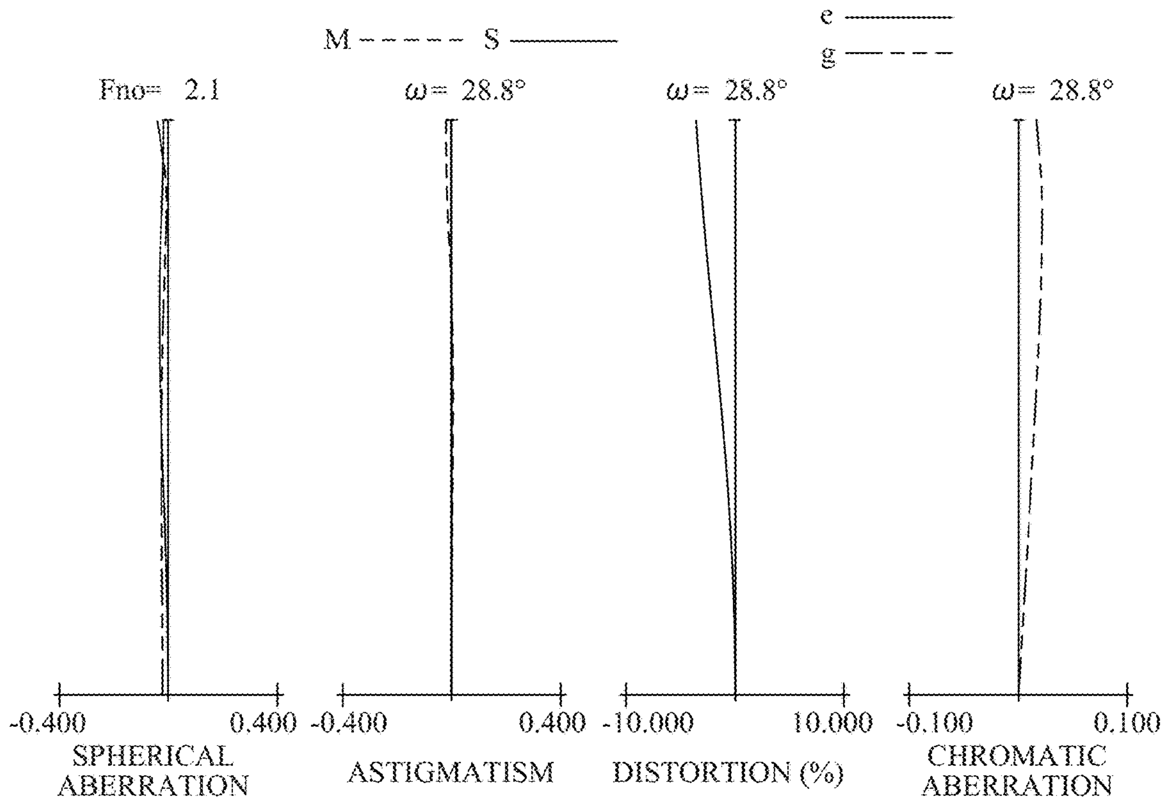
FIGS. 10A, 10B, and 10C are aberration diagrams at the wide-angle end, intermediate zoom position, and telephoto end in an in-focus state at infinity of the zoom lens according to numerical example 5.
Figure 10B:
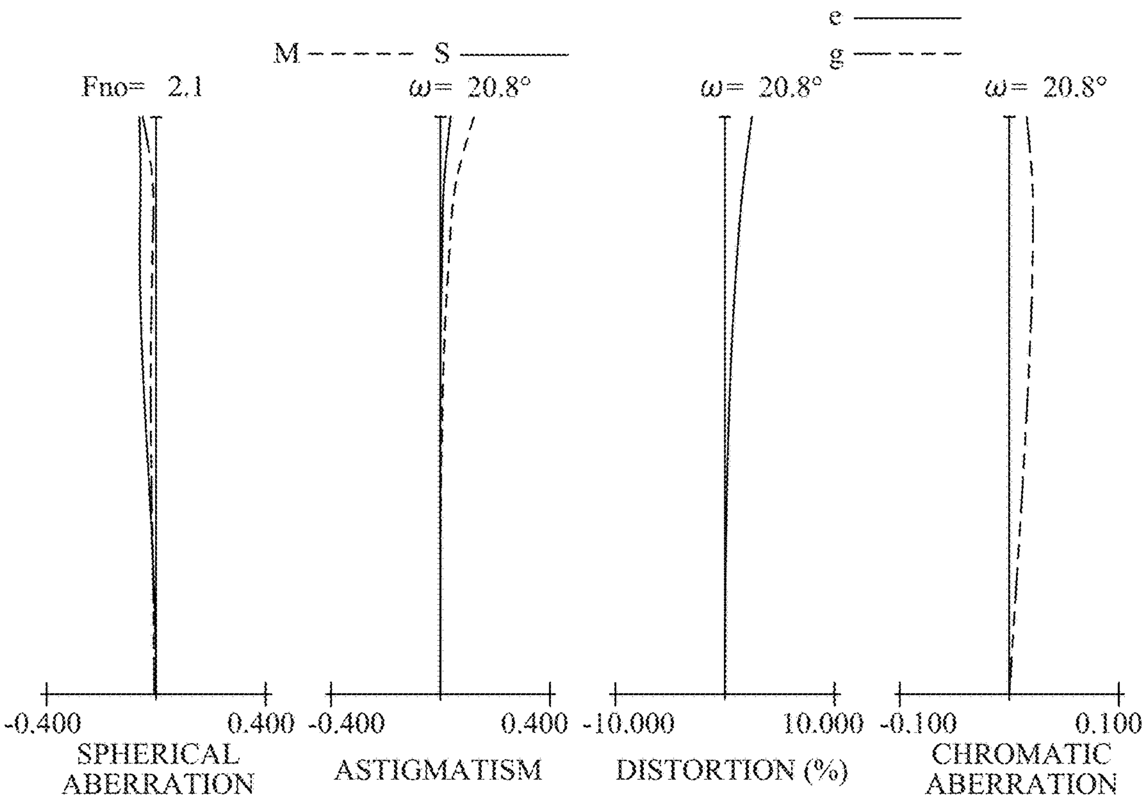
Figure 10C:
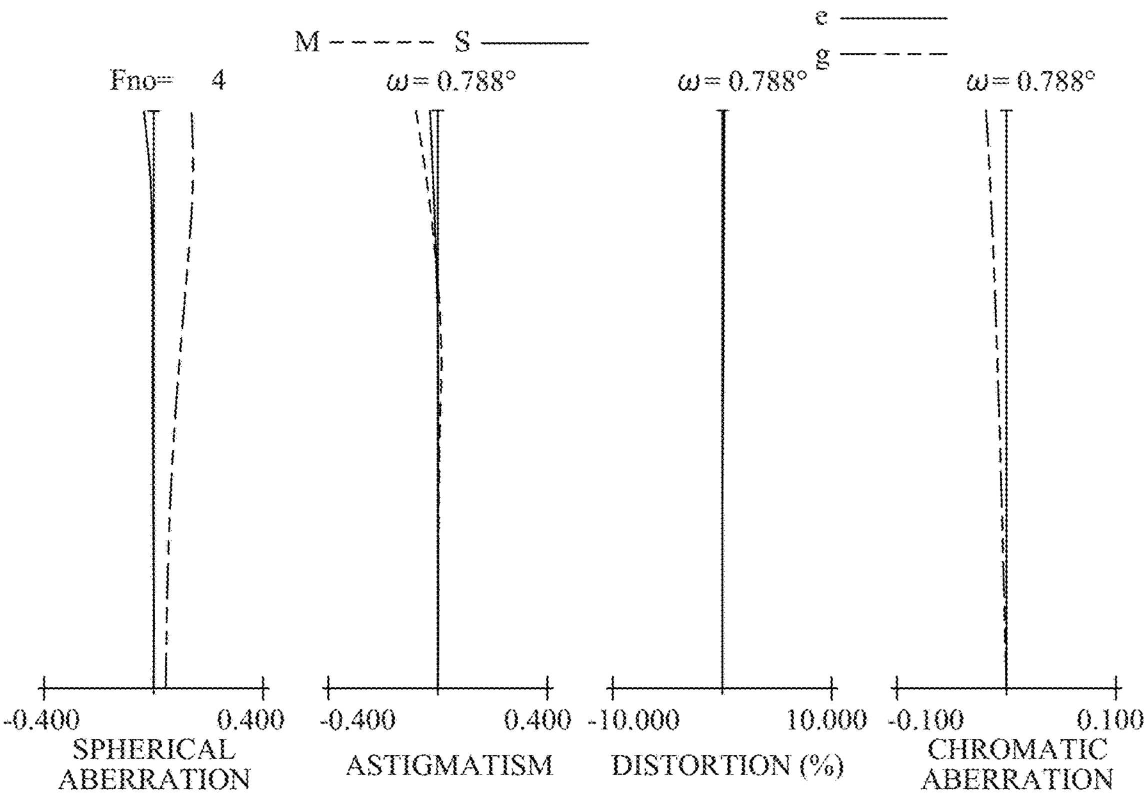

FIGS. 10A, 10B, and 10C are longitudinal aberration diagrams of the zoom lens according to numerical example 5 at a wide-angle end, a focal length of 14.5 m, and a telephoto end, respectively, in an in-focus state at infinity.

NUMERICAL EXAMPLE 1
UNIT: mm

SURFACE DATA

| Surface No. | r | d | nd | νd | Effective Diameter |
|---|---|---|---|---|---|
| 1 | −1989.919 | 6.00 | 1.83481 | 42.7 | 219.43 |
| 2 | 343.385 | 1.50 | | | 203.40 |
| 3 | 340.988 | 25.49 | 1.43387 | 95.1 | 202.40 |
| 4 | −798.110 | 0.20 | | | 199.84 |
| 5 | 576.885 | 14.12 | 1.43387 | 95.1 | 198.78 |
| 6 | −1695.032 | 23.99 | | | 198.88 |
| 7 | 364.890 | 17.66 | 1.43387 | 95.1 | 199.20 |
| 8 | −4489.430 | 0.25 | | | 198.76 |
| 9 | 289.702 | 17.83 | 1.43387 | 95.1 | 194.09 |
| 10 | 2932.921 | 1.88 | | | 193.04 |
| 11 | 190.504 | 15.55 | 1.43387 | 95.1 | 180.57 |
| 12 | 424.796 | (Variable) | | | 178.95 |
| 13* | −383.841 | 2.20 | 2.00331 | 28.3 | 45.89 |
| 14 | 32.490 | 11.84 | | | 37.76 |
| 15 | −44.078 | 1.45 | 1.79952 | 42.2 | 36.73 |
| 16 | 47.618 | 11.70 | 1.89285 | 20.4 | 37.86 |
| 17 | −48.151 | 1.79 | | | 38.13 |
| 18 | −37.117 | 2.00 | 1.83481 | 42.7 | 37.69 |
| 19 | −85.010 | (Variable) | | | 39.24 |
| 20 | 105.725 | 8.73 | 1.78800 | 47.4 | 80.61 |
| 21* | 967.961 | 4.99 | | | 80.44 |
| 22 | 137.524 | 15.67 | 1.43875 | 94.7 | 81.34 |
| 23 | −140.378 | 0.76 | | | 80.91 |
| 24 | 143.798 | 2.50 | 1.85478 | 24.8 | 75.44 |

-continued

NUMERICAL EXAMPLE 1
UNIT: mm

| | | | | | |
|---|---|---|---|---|---|
| 25 | 71.354 | (Variable) | | | 71.84 |
| 26 | 84.942 | 14.69 | 1.49700 | 81.5 | 72.09 |
| 27 | −244.355 | 2.60 | 1.84666 | 23.8 | 70.93 |
| 28 | 5160.507 | 0.20 | | | 70.04 |
| 29* | 286.828 | 7.18 | 1.59522 | 67.7 | 69.50 |
| 30 | −204.220 | (Variable) | | | 68.87 |
| 31 (SP) | ∞ | 3.11 | | | 33.95 |
| 32 | −1575.347 | 1.40 | 1.89190 | 37.1 | 32.02 |
| 33 | 36.840 | 0.95 | | | 30.51 |
| 34 | 32.181 | 3.92 | 1.92286 | 18.9 | 30.85 |
| 35 | 66.232 | 6.09 | | | 30.15 |
| 36 | −41.236 | 1.50 | 1.88300 | 40.8 | 29.58 |
| 37 | −60.213 | 8.15 | | | 30.01 |
| 38 | −241.324 | 1.50 | 1.89190 | 37.1 | 28.92 |
| 39 | 43.699 | 4.19 | 1.84666 | 23.8 | 28.91 |
| 40 | 375.433 | 4.79 | | | 28.94 |
| 41 | −54.596 | 1.50 | 1.88300 | 40.8 | 29.17 |
| 42 | 152.708 | 7.90 | 1.51742 | 52.4 | 30.47 |
| 43 | −27.763 | 15.80 | | | 31.45 |
| 44 | 59.604 | 4.99 | 1.53172 | 48.8 | 31.05 |
| 45 | −128.952 | 1.40 | | | 30.65 |
| 46 | −75.323 | 1.50 | 1.89190 | 37.1 | 30.30 |
| 47 | 35.799 | 7.43 | 1.48749 | 70.2 | 30.11 |
| 48 | −112.790 | 0.20 | | | 30.80 |
| 49 | 93.996 | 7.38 | 1.51633 | 64.1 | 31.31 |
| 50 | −36.203 | 1.50 | 1.88300 | 40.8 | 31.34 |
| 51 | −84.026 | 0.20 | | | 32.04 |
| 52 | 65.522 | 6.25 | 1.54814 | 45.8 | 32.13 |
| 53 | −61.030 | 10.00 | | | 31.79 |
| 54 | ∞ | 33.00 | 1.60859 | 46.4 | 60.00 |
| 55 | ∞ | 13.20 | 1.51633 | 64.2 | 60.00 |
| 56 | ∞ | 13.28 | | | 60.00 |
| Image Plane | ∞ | | | | |

ASPHERIC DATA

13th Surface
k = 2.00000e+00 A 4 = 2.79674e−06 A 6 = 2.18657e−08 A 8 = 7.32202e−10
A10 = 2.12926e−12 A12 = −3.50563e−15 A14 = −4.90182e−18 A16 = −3.80788e−22
A 3 = −4.05060e−07 A 5 = −4.83707e−08 A 7 = −5.56176e−09 A 9 = −5.49621e−11
A11 = −7.40424e−15 A13 = 1.86927e−16 A15 = 6.78738e−20
21st Surface
k = −2.00000e+00 A 4 = 3.81510e−07 A 6 = 1.54971e−10 A 8 = −3.83744e−13
A10 = −8.68258e−16 A12 = −3.54544e−19 A14 = −6.39080e−23 A16 = −9.01375e−27
A 3 = −1.62590e−07 A 5 = −2.84792e−09 A 7 = −1.05666e−12 A 9 = 2.55941e−14
A11 = 2.02105e−17 A13 = 4.69195e−21 A15 = 1.05641e−24
29th Surface
k = −1.75661e+00 A 4 = 2.81546e−08 A 6 = 1.27106e−08 A 8 = 5.47326e−11
A10 = −3.03591e−15 A12 = 4.91519e−18 A14 = 3.18642e−20 A16 = 1.79803e−24
A 3 = −4.66698e−07 A 5 = −8.40144e−08 A 7 = −1.10345e−09 A 9 = −1.30281e−12
A11 = 7.47107e−16 A13 = −1.13669e−18 A15 = −3.85878e−22

VARIOUS DATA
ZOOM RATIO 144.44

| | WIDE | MIDDLE | TELE |
|---|---|---|---|
| Focal Length | 7.48 | 12.30 | 1080.41 |
| Fno | 1.77 | 1.77 | 5.62 |
| Half Angle of View (°) | 36.33 | 24.09 | 0.29 |
| Image Height | 5.50 | 5.50 | 5.50 |
| Overall Lens Length | 683.40 | 683.40 | 683.40 |
| BF | 13.28 | 13.28 | 13.28 |
| d12 | 3.49 | 40.60 | 195.70 |
| d19 | 294.93 | 235.45 | 2.14 |
| d25 | 8.08 | 28.17 | 4.73 |
| d30 | 3.00 | 5.27 | 106.93 |
| EnPP | 127.44 | 195.84 | 16266.52 |
| ExPP | 155.34 | 155.34 | 155.34 |
| FPPP | 135.32 | 209.20 | 25563.65 |
| RPPP | 5.80 | 0.98 | −1067.14 |

-continued

NUMERICAL EXAMPLE 1
UNIT: mm

LENS UNIT DATA

| LU | SS | FL | LCL | FPPP | RPPP |
|---|---|---|---|---|---|
| 1 | 1 | 248.16 | 124.48 | 71.65 | −18.57 |
| 2 | 13 | −22.00 | 30.98 | 2.62 | −20.00 |
| 3 | 20 | 132.06 | 32.66 | −6.58 | −27.43 |
| 4 | 26 | 111.88 | 24.67 | 6.05 | −10.40 |
| 5 | 32 | 41.10 | 147.84 | 58.42 | 16.76 |

Moving Amount during Focusing (where Direction from Object Side to Image Side is Positive)

| Lens Unit | Infinity | Closest Distance(3.0 m) |
|---|---|---|
| Wide-Angle End | | |
| Second Sub-Lens Unit L12 | 0.000 | −0.299 |
| Third Sub-Lens Unit L13 | 0.000 | 0.006 |
| Fourth Sub-Lens Unit L51 | 0.000 | −0.018 |
| f = 12.3 mm | | |
| Second Sub-Lens Unit L12 | 0.000 | 1.906 |
| Third Sub-Lens Unit L13 | 0.000 | 1.060 |
| Fourth Sub-Lens Unit L51 | 0.000 | −0.050 |
| Telephoto End | | |
| Second Sub-Lens Unit L12 | 0.000 | −22.011 |
| Third Sub-Lens Unit L13 | 0.000 | −21.903 |
| Fourth Sub-Lens Unit L51 | 0.000 | 0.000 |

NUMERICAL EXAMPLE 2
UNIT: mm

SURFACE DATA

| Surface No. | r | d | nd | νd | Effective Diameter |
|---|---|---|---|---|---|
| 1 | −2008.773 | 4.50 | 1.83481 | 42.7 | 220.09 |
| 2 | 341.259 | 1.20 | | | 204.95 |
| 3 | 341.062 | 26.91 | 1.43387 | 95.1 | 204.29 |
| 4 | −787.949 | 0.20 | | | 201.40 |
| 5 | 568.238 | 13.95 | 1.43387 | 95.1 | 199.47 |
| 6 | −1879.821 | 23.54 | | | 199.58 |
| 7 | 357.752 | 18.03 | 1.43387 | 95.1 | 200.08 |
| 8 | −4445.688 | 0.25 | | | 199.64 |
| 9 | 290.525 | 17.82 | 1.43387 | 95.1 | 194.91 |
| 10 | 2955.755 | 1.58 | | | 193.89 |
| 11 | 188.856 | 15.76 | 1.43387 | 95.1 | 181.28 |
| 12 | 427.955 | (Variable) | | | 179.78 |
| 13* | −345.896 | 2.20 | 2.00330 | 28.3 | 46.34 |
| 14 | 31.848 | 12.06 | | | 37.84 |
| 15 | −43.914 | 1.45 | 1.80610 | 40.9 | 36.80 |
| 16 | 46.106 | 13.42 | 1.89286 | 20.4 | 38.01 |
| 17 | −47.620 | 2.23 | | | 38.40 |
| 18 | −37.052 | 2.00 | 1.83481 | 42.7 | 37.50 |
| 19 | −85.494 | (Variable) | | | 39.96 |
| 20 | 105.357 | 8.87 | 1.78800 | 47.4 | 81.38 |
| 21* | 966.564 | 4.61 | | | 81.20 |
| 22 | 138.237 | 15.88 | 1.43875 | 94.7 | 82.11 |
| 23 | −140.363 | 0.89 | | | 81.68 |
| 24 | 144.281 | 2.50 | 1.85478 | 24.8 | 76.06 |
| 25 | 71.374 | (Variable) | | | 72.41 |
| 26 | 85.602 | 14.58 | 1.49700 | 81.5 | 72.63 |
| 27 | −246.445 | 2.60 | 1.84666 | 23.8 | 71.55 |
| 28 | 3835.484 | 0.20 | | | 70.66 |
| 29* | 286.488 | 7.43 | 1.59522 | 67.7 | 70.14 |
| 30 | −202.605 | (Variable) | | | 69.49 |
| 31 (SP) | ∞ | 3.10 | | | 33.88 |
| 32 | −1375.104 | 1.40 | 1.89190 | 37.1 | 31.98 |
| 33 | 36.733 | 0.99 | | | 30.49 |
| 34 | 32.443 | 3.92 | 1.92286 | 18.9 | 30.84 |
| 35 | 67.852 | 5.93 | | | 30.16 |

-continued

| NUMERICAL EXAMPLE 2<br>UNIT: mm | | | | | |
|---|---|---|---|---|---|
| 36 | −42.988 | 1.50 | 1.88300 | 40.8 | 29.61 |
| 37 | −62.875 | 8.27 | | | 30.00 |
| 38 | −167.300 | 1.50 | 1.89190 | 37.1 | 28.91 |
| 39 | 48.179 | 4.12 | 1.84666 | 23.8 | 29.00 |
| 40 | 882.332 | 5.91 | | | 29.07 |
| 41 | −58.557 | 1.50 | 1.88300 | 40.8 | 29.45 |
| 42 | 165.174 | 7.84 | 1.51742 | 52.4 | 30.65 |
| 43 | −29.157 | 14.67 | | | 31.67 |
| 44 | 63.616 | 5.25 | 1.53172 | 48.8 | 31.40 |
| 45 | −110.254 | 1.73 | | | 30.99 |
| 46 | −74.177 | 1.50 | 1.89190 | 37.1 | 30.44 |
| 47 | 36.495 | 7.08 | 1.48749 | 70.2 | 30.26 |
| 48 | −116.419 | 0.20 | | | 30.88 |
| 49 | 88.421 | 7.46 | 1.51633 | 64.1 | 31.40 |
| 50 | −36.485 | 1.50 | 1.88300 | 40.8 | 31.42 |
| 51 | −83.500 | 0.20 | | | 32.08 |
| 52 | 68.076 | 6.14 | 1.54814 | 45.8 | 32.12 |
| 53 | −61.762 | 10.00 | | | 31.76 |
| 54 | ∞ | 33.00 | 1.60859 | 46.4 | 60.00 |
| 55 | ∞ | 13.20 | 1.51633 | 64.2 | 60.00 |
| 56 | ∞ | 13.24 | | | 60.00 |
| Image Plane | ∞ | | | | |

ASPHERIC DATA

13th Surface
k = 4.98214e−01 A 4 = 2.95583e−06 A 6 = 2.21467e−08 A 8 = 7.33531e−10
A10 = 2.12417e−12 A12 = −3.52475e−15 A14 = −4.89522e−18 A16 = −3.64394e−22
A 3 = −3.31149e−07 A 5 = −4.00773e−08 A 7 = −5.61469e−09 A 9 = −5.49290e−11
A11 = −6.92998e−15 A13 = 1.87175e−16 A15 = 6.71986e−20
21st Surface
k = −1.48686e+00 A 4 = 3.86319e−07 A 6 = 1.46291e−10 A 8 = −4.10001e−13
A10 = −8.68990e−16 A12 = −3.41381e−19 A14 = −7.40021e−23 A16 = −9.93137e−27
A 3 = −4.57837e−08 A 5 = −3.03480e−09 A 7 = −3.87830e−13 A 9 = 2.63636e−14
A11 = 1.95400e−17 A13 = 4.85408e−21 A15 = 1.21659e−24
29th Surface
k = 1.82313e+00 A 4 = 4.29654e−08 A 6 = 1.26702e−08 A 8 = 5.47075e−11
A10 = −3.18988e−15 A12 = 4.61305e−18 A14 = 3.18382e−20 A16 = 1.80206e−24
A 3 = −4.15136e−07 A 5 = −8.49989e−08 A 7 = −1.10137e−09 A 9 = −1.30109e−12
A11 = 7.55397e−16 A13 = −1.13098e−18 A15 = −3.86386e−22

VARIOUS DATA
ZOOM RATIO 144.43

| | WIDE | MIDDLE | TELE |
|---|---|---|---|
| Focal Length | 7.28 | 11.97 | 1051.45 |
| Fno | 1.76 | 1.77 | 5.45 |
| Half Angle of View (°) | 37.07 | 24.68 | 0.30 |
| Image Height | 5.50 | 5.50 | 5.50 |
| Overall Lens Length | 682.90 | 682.90 | 682.90 |
| BF | 13.24 | 13.24 | 13.24 |
| d12 | 3.46 | 40.42 | 194.61 |
| d19 | 293.09 | 233.90 | 3.17 |
| d25 | 7.58 | 27.48 | 4.82 |
| d30 | 2.95 | 5.27 | 104.48 |
| EnPP | 126.02 | 193.93 | 15778.91 |
| ExPP | 156.70 | 156.70 | 156.70 |
| FPPP | 133.66 | 206.90 | 24536.56 |
| RPPP | 5.96 | 1.27 | −1038.21 |

LENS UNIT DATA

| LU | SS | FL | LCL | FPPP | RPPP |
|---|---|---|---|---|---|
| 1 | 1 | 246.01 | 123.74 | 71.21 | −18.35 |
| 2 | 13 | −21.50 | 33.37 | 2.60 | −21.58 |
| 3 | 20 | 131.87 | 32.74 | −6.81 | −27.56 |
| 4 | 26 | 112.66 | 24.81 | 6.11 | −10.43 |
| 5 | 32 | 41.27 | 147.92 | 58.46 | 16.35 |

-continued

NUMERICAL EXAMPLE 2
UNIT: mm

Moving Amount during Focusing (where Direction from Object Side to Image Side is Positive)

| Lens Unit | Infinity | Closest Distance (3.0 m) |
|---|---|---|
| Wide-Angle End | | |
| Second Sub-Lens Unit L12 | 0.000 | 1.361 |
| Third Sub-Lens Unit L13 | 0.000 | 0.356 |
| Fourth Sub-Lens Unit L51 | 0.000 | −0.018 |
| f = 12.0 mm | | |
| Second Sub-Lens Unit L12 | 0.000 | 0.196 |
| Third Sub-Lens Unit L13 | 0.000 | 0.002 |
| Fourth Sub-Lens Unit L51 | 0.000 | −0.045 |
| Telephoto End | | |
| Second Sub-Lens Unit L12 | 0.000 | −21.575 |
| Third Sub-Lens Unit L13 | 0.000 | −21.159 |
| Fourth Sub-Lens Unit L51 | 0.000 | −4.000 |

NUMERICAL EXAMPLE 3
UNIT: mm

SURFACE DATA

| Surface No. | r | d | nd | νd | Effective Diameter |
|---|---|---|---|---|---|
| 1 | −2051.267 | 6.00 | 1.83481 | 42.7 | 217.72 |
| 2 | 340.724 | 1.50 | | | 202.76 |
| 3 | 339.336 | 24.67 | 1.43387 | 95.1 | 201.90 |
| 4 | −827.182 | 0.20 | | | 199.91 |
| 5 | 591.122 | 13.61 | 1.43387 | 95.1 | 197.92 |
| 6 | −1775.457 | 24.17 | | | 198.04 |
| 7 | 367.772 | 18.15 | 1.43387 | 95.1 | 198.79 |
| 8 | −2793.410 | 0.25 | | | 198.36 |
| 9 | 279.644 | 18.36 | 1.43387 | 95.1 | 193.42 |
| 10 | 2958.242 | 1.60 | | | 192.36 |
| 11 | 191.033 | 14.87 | 1.43387 | 95.1 | 179.92 |
| 12 | 405.065 | (Variable) | | | 178.31 |
| 13* | −298.512 | 2.20 | 2.00331 | 28.3 | 45.57 |
| 14 | 33.141 | 11.65 | | | 37.79 |
| 15 | −44.679 | 1.45 | 1.79952 | 42.2 | 36.87 |
| 16 | 47.964 | 11.72 | 1.89285 | 20.4 | 38.19 |
| 17 | −47.644 | 3.42 | | | 38.50 |
| 18 | −36.893 | 2.00 | 1.83481 | 42.7 | 36.85 |
| 19 | −88.249 | (Variable) | | | 39.36 |
| 20 | 110.037 | 10.87 | 1.78800 | 47.4 | 81.43 |
| 21* | 6443.817 | 5.64 | | | 81.22 |
| 22 | 140.857 | 15.39 | 1.43875 | 94.7 | 81.93 |
| 23 | −147.451 | 0.50 | | | 81.44 |
| 24 | 151.512 | 2.50 | 1.85478 | 24.8 | 76.13 |
| 25 | 72.501 | (Variable) | | | 72.47 |
| 26 | 81.681 | 15.05 | 1.49700 | 81.5 | 72.69 |
| 27 | −251.082 | 2.60 | 1.84666 | 23.8 | 71.50 |
| 28 | 3254.834 | 0.20 | | | 70.51 |
| 29* | 274.172 | 7.34 | 1.59522 | 67.7 | 69.93 |
| 30 | −200.791 | (Variable) | | | 69.27 |
| 31 (SP) | ∞ | 3.36 | | | 34.15 |
| 32 | −404.772 | 1.40 | 1.89190 | 37.1 | 32.11 |
| 33 | 38.439 | 0.96 | | | 30.64 |
| 34 | 33.482 | 3.84 | 1.92286 | 18.9 | 30.97 |
| 35 | 69.018 | 5.81 | | | 30.30 |
| 36 | −45.006 | 1.50 | 1.88300 | 40.8 | 29.77 |
| 37 | −62.275 | 6.73 | | | 30.12 |
| 38 | −121.433 | 1.50 | 1.89190 | 37.1 | 29.03 |
| 39 | 50.539 | 4.63 | 1.84666 | 23.8 | 29.21 |
| 40 | −288.548 | 3.18 | | | 29.33 |
| 41 | −53.549 | 1.50 | 1.88300 | 40.8 | 29.35 |
| 42 | 117.689 | 8.27 | 1.51742 | 52.4 | 30.59 |
| 43 | −29.559 | 11.89 | | | 31.69 |
| 44 | 65.597 | 5.31 | 1.53172 | 48.8 | 31.52 |
| 45 | −89.878 | 1.40 | | | 31.16 |

-continued

NUMERICAL EXAMPLE 3
UNIT: mm

| | | | | | |
|---|---|---|---|---|---|
| 46 | −71.807 | 1.50 | 1.89190 | 37.1 | 30.63 |
| 47 | 36.179 | 7.38 | 1.48749 | 70.2 | 30.41 |
| 48 | −87.097 | 0.20 | | | 30.99 |
| 49 | 121.849 | 7.28 | 1.51633 | 64.1 | 31.38 |
| 50 | −34.627 | 1.50 | 1.88300 | 40.8 | 31.40 |
| 51 | −84.471 | 0.20 | | | 32.16 |
| 52 | 78.343 | 6.31 | 1.54814 | 45.8 | 32.29 |
| 53 | −52.748 | 10.00 | | | 32.03 |
| 54 | ∞ | 33.00 | 1.60859 | 46.4 | 60.00 |
| 55 | ∞ | 13.20 | 1.51633 | 64.2 | 60.00 |
| 56 | ∞ | 13.29 | | | 60.00 |
| Image Plane | ∞ | | | | |

ASPHERIC DATA

13th Surface
k = − 2.00000e+00 A 4 = 2.76310e−06 A 6 = 2.17763e−08 A 8 = 7.31716e−10
A10 = 2.12621e−12 A12 = − 3.51253e−15 A14 = − 4.90923e−18 A16 = −3.81540e−22
A 3 = −2.73241e−08 A 5 = −3.97657e−08 A 7 = −5.57160e−09 A 9 = −5.48993e−11
A11 = −7.24465e−15 A13 = 1.87154e−16 A15 = 6.80212e−20
21st Surface
k = −2.00000e+00 A 4 = 3.81456e−07 A 6 = 1.68328e−10 A 8 = −3.88813e−13
A10 = −8.70461e−16 A12 = −3.54086e−19 A14 = −6.39506e−23 A16 = −9.07629e−27
A 3 = −2.98974e−07 A 5 = −3.71294e−09 A 7 = −9.50631e−13 A 9 = 2.56457e−14
A11 = 2.02234e−17 A13 = 4.69131e−21 A15 = 1.06042e−24
29th Surface
k = −2.65794e−01 A 4 = 6.42526e−08 A 6 = 1.27033e−08 A 8 = 5.47492e−11
A10 = −3.08385e−15 A12 = 4.94591e−18 A14 = 3.18895e−20 A16 = 1.78549e−24
A 3 = −9.04623e−07 A 5 = −8.71268e−08 A 7 = −1.10114e−09 A 9 = −1.30327e−12
A11 = 7.46774e−16 A13 = −1.13740e−18 A15 = −3.85637e−22

VARIOUS DATA
ZOOM RATIO 144.44

| | WIDE | MIDDLE | TELE |
|---|---|---|---|
| Focal Length | 7.59 | 12.48 | 1096.56 |
| Fno | 1.76 | 1.77 | 5.72 |
| Half Angle of View (°) | 35.92 | 23.78 | 0.29 |
| Image Height | 5.50 | 5.50 | 5.50 |
| Overall Lens Length | 677.57 | 677.57 | 677.57 |
| BF | 13.29 | 13.29 | 13.29 |
| d12 | 3.71 | 41.13 | 196.01 |
| d19 | 292.07 | 232.97 | 2.00 |
| d25 | 7.77 | 27.14 | 4.22 |
| d30 | 2.96 | 5.26 | 104.27 |
| EnPP | 126.82 | 195.80 | 16164.96 |
| ExPP | 235.51 | 235.51 | 235.51 |
| FPPP | 134.67 | 208.99 | 22672.64 |
| RPPP | 5.70 | 0.81 | −1083.27 |

LENS UNIT DATA

| LU | SS | FL | LCL | FPPP | RPPP |
|---|---|---|---|---|---|
| 1 | 1 | 248.00 | 123.38 | 71.30 | −18.14 |
| 2 | 13 | −21.59 | 32.45 | 3.00 | −20.31 |
| 3 | 20 | 130.91 | 34.90 | −6.58 | −28.64 |
| 4 | 26 | 108.30 | 25.19 | 6.11 | −10.72 |
| 5 | 32 | 46.10 | 141.85 | 58.60 | 19.45 |

Moving Amount during Focusing (where Direction
from Object Side to Image Side is Positive)

| Lens Unit | Infinity | Closest Distance (3.0 m) |
|---|---|---|
| Wide-Angle End | | |
| Second Sub-Lens Unit L12 | 0.000 | −9.437 |
| Third Sub-Lens Unit L13 | 0.000 | −0.469 |
| Fourth Sub-Lens Unit L51 | 0.000 | −0.015 |
| f = 12.5 mm | | |
| Second Sub-Lens Unit L12 | 0.000 | 2.701 |
| Third Sub-Lens Unit L13 | 0.000 | 3.662 |
| Fourth Sub-Lens Unit L51 | 0.000 | −0.055 |

-continued

NUMERICAL EXAMPLE 3
UNIT: mm

| Telephoto End | | |
|---|---|---|
| Second Sub-Lens Unit L12 | 0.000 | −22.201 |
| Third Sub-Lens Unit L13 | 0.000 | −21.798 |
| Fourth Sub-Lens Unit L51 | 0.000 | 0.000 |

NUMERICAL EXAMPLE 4
UNIT: mm

SURFACE DATA

| Surface No. | r | d | nd | νd | Effective Diameter |
|---|---|---|---|---|---|
| 1 | −2952.650 | 6.00 | 1.83400 | 37.2 | 200.62 |
| 2 | 382.140 | 1.80 | | | 194.13 |
| 3 | 388.866 | 24.40 | 1.43387 | 95.1 | 194.68 |
| 4 | −700.716 | 0.20 | | | 195.66 |
| 5 | 765.028 | 9.43 | 1.49700 | 81.5 | 197.72 |
| 6 | 26529.279 | 24.09 | | | 197.76 |
| 7 | 344.600 | 19.76 | 1.43387 | 95.1 | 198.72 |
| 8 | −3028.730 | 0.25 | | | 198.15 |
| 9 | 273.926 | 18.29 | 1.43387 | 95.1 | 193.00 |
| 10 | 1815.209 | 1.50 | | | 191.66 |
| 11 | 203.605 | 14.56 | 1.49700 | 81.5 | 180.65 |
| 12 | 418.214 | (Variable) | | | 178.68 |
| 13* | −358.516 | 2.20 | 2.00330 | 28.3 | 48.60 |
| 14 | 44.279 | 10.21 | | | 42.07 |
| 15 | −75.144 | 1.45 | 1.83481 | 42.7 | 40.88 |
| 16 | 49.982 | 10.13 | 1.92286 | 18.9 | 40.62 |
| 17 | −63.542 | 2.73 | | | 40.44 |
| 18 | −47.373 | 2.00 | 1.88300 | 40.8 | 39.84 |
| 19 | −457.413 | (Variable) | | | 42.05 |
| 20 | 147.898 | 11.09 | 1.69680 | 55.5 | 83.62 |
| 21* | −277.541 | 1.34 | | | 83.94 |
| 22 | 131.804 | 17.76 | 1.43875 | 94.7 | 85.20 |
| 23 | −129.837 | 2.54 | | | 84.76 |
| 24 | 296.713 | 2.60 | 1.85478 | 24.8 | 78.40 |
| 25 | 99.836 | (Variable) | | | 75.43 |
| 26 | 115.985 | 2.50 | 1.85478 | 24.8 | 74.91 |
| 27 | 77.127 | 11.08 | 1.49700 | 81.5 | 73.03 |
| 28 | 1707.174 | 0.20 | | | 72.64 |
| 29* | 149.309 | 8.66 | 1.60311 | 60.6 | 71.66 |
| 30 | −462.589 | (Variable) | | | 70.68 |
| 31 (SP) | ∞ | 5.34 | | | 33.79 |
| 32 | −106.815 | 1.40 | 1.88300 | 40.8 | 31.08 |
| 33 | 47.773 | 1.11 | | | 30.18 |
| 34 | 38.578 | 3.75 | 1.92286 | 18.9 | 30.65 |
| 35 | 95.740 | 4.68 | | | 30.14 |
| 36 | −58.027 | 1.70 | 1.80400 | 46.5 | 29.75 |
| 37 | −87.803 | 7.41 | | | 29.98 |
| 38 | 123.415 | 1.50 | 1.80400 | 46.5 | 29.02 |
| 39 | 31.454 | 4.72 | 1.84666 | 23.9 | 28.37 |
| 40 | 65.618 | 6.14 | | | 27.86 |
| 41 | −32.583 | 1.50 | 1.89190 | 37.1 | 27.90 |
| 42 | 228.719 | 8.25 | 1.51633 | 64.1 | 30.23 |
| 43 | −26.927 | 10.97 | | | 31.80 |
| 44 | 58.804 | 7.65 | 1.51742 | 52.4 | 36.04 |
| 45 | −68.745 | 1.40 | | | 35.85 |
| 46 | −185.002 | 1.50 | 1.88300 | 40.8 | 34.61 |
| 47 | 49.093 | 8.07 | 1.48749 | 70.2 | 33.94 |
| 48 | −58.823 | 0.20 | | | 34.03 |
| 49 | 74.377 | 9.29 | 1.51742 | 52.4 | 32.90 |
| 50 | −39.928 | 1.50 | 1.88300 | 40.8 | 31.57 |
| 51 | −244.656 | 0.20 | | | 31.24 |
| 52 | 101.898 | 7.21 | 1.53996 | 59.5 | 30.75 |
| 53 | −113.528 | 5.93 | | | 29.34 |
| 54 | ∞ | 33.00 | 1.60859 | 46.4 | 60.00 |
| 55 | ∞ | 13.20 | 1.51633 | 64.2 | 60.00 |
| 56 | ∞ | 13.92 | | | 60.00 |
| Image Plane | ∞ | | | | |

-continued

NUMERICAL EXAMPLE 4
UNIT: mm

ASPHERIC DATA

13th Surface
k = 1.59939e+00 A 4 = 1.04493e−06 A 6 = −2.62173e−08 A 8 = −3.03736e−10
A10 = 8.93863e−13 A12 = 3.23638e−15 A14 = 1.64495e−18 A16 = 5.15456e−22
A 3 = 2.63147e−07 A 5 = 9.06039e−08 A 7 = 3.91967e−09 A 9 = 6.19665e−12
A11 = −8.33928e−14 A13 = −7.34880e−17 A15 = −4.16695e−20
21st Surface
k = 6.69742e+00 A 4 = 4.04488e−07 A 6 = −7.32603e−11 A 8 = 5.42241e−14
A10 = 7.31719e−17 A12 = −2.97911e−20 A14 = 3.60991e−23 A16 = −2.06168e−28
A 3 = −7.03642e−08 A 5 = 1.48648e−09 A 7 = 5.87324e−13 A 9 = −2.59047e−15
A11 = −4.36458e−20 A13 = −6.18036e−22 A15 = −3.45818e−25
29th Surface
k = 5.30341e+00 A 4 = −2.55551e−07 A 6 = −8.14464e−10 A 8 = −2.37375e−13
A10 = 5.04334e−16 A12 = −1.38421e−19 A14 = 8.53415e−23 A16 = −8.26363e−26
A 3 = −1.19884e−07 A 5 = 9.75693e−09 A 7 = 2.57406e−11 A 9 = −1.52340e−14
A11 = 2.00987e−18 A13 = −6.42083e−21 A15 = 4.85077e−24

VARIOUS DATA
ZOOM RATIO 125.00

| | WIDE | MIDDLE | TELE |
|---|---|---|---|
| Focal Length | 8.50 | 13.78 | 1062.49 |
| Fno | 1.75 | 1.75 | 5.50 |
| Half Angle of View (°) | 32.91 | 21.76 | 0.30 |
| Image Height | 5.50 | 5.50 | 5.50 |
| Overall Lens Length | 672.29 | 672.29 | 672.29 |
| BF | 13.92 | 13.92 | 13.92 |
| d12 | 3.66 | 44.69 | 188.54 |
| d19 | 292.86 | 239.24 | 2.00 |
| d25 | 4.46 | 15.12 | 4.73 |
| d30 | 2.97 | 4.90 | 108.68 |
| EnPP | 132.19 | 214.34 | 15229.74 |
| ExPP | 192.78 | 192.78 | 192.78 |
| FPPP | 141.09 | 229.18 | 22604.01 |
| RPPP | 5.42 | 0.15 | −1048.57 |

LENS UNIT DATA

| LU | SS | FL | LCL | FPPP | RPPP |
|---|---|---|---|---|---|
| 1 | 1 | 248.00 | 120.28 | 67.91 | −19.53 |
| 2 | 13 | −24.28 | 28.72 | 5.00 | −14.14 |
| 3 | 20 | 113.57 | 35.34 | −3.01 | −25.41 |
| 4 | 26 | 131.03 | 22.44 | 6.05 | −8.58 |
| 5 | 32 | 43.99 | 147.62 | 58.72 | 17.52 |

Moving Amount during Focusing (where Direction from Object Side to Image Side is Positive)

| Lens Unit | Infinity | Closest Distance (3.0 m) |
|---|---|---|
| Wide-Angle End | | |
| Second Sub-Lens Unit L12 | 0.000 | −1.654 |
| Third Sub-Lens Unit L13 | 0.000 | −0.139 |
| Fourth Sub-Lens Unit L51 | 0.000 | −0.025 |
| f = 13.8 mm | | |
| Second Sub-Lens Unit L12 | 0.000 | −4.405 |
| Third Sub-Lens Unit L13 | 0.000 | −0.746 |
| Fourth Sub-Lens Unit L51 | 0.000 | −0.060 |
| Telephoto End | | |
| Second Sub-Lens Unit L12 | 0.000 | −22.083 |
| Third Sub-Lens Unit L13 | 0.000 | −21.856 |
| Fourth Sub-Lens Unit L51 | 0.000 | −2.000 |

NUMERICAL EXAMPLE 5
UNIT: mm

SURFACE DATA

| Surface No. | r | d | nd | νd | Effective Diameter |
|---|---|---|---|---|---|
| 1 | −359.395 | 2.50 | 1.75700 | 47.8 | 108.06 |
| 2 | 396.597 | 3.49 | | | 106.70 |
| 3 | 3117.014 | 2.50 | 1.80100 | 35.0 | 106.69 |
| 4 | 428.503 | 10.31 | 1.53775 | 74.7 | 106.53 |
| 5 | −298.825 | 0.20 | | | 106.54 |
| 6 | 308.225 | 11.09 | 1.43387 | 95.1 | 105.81 |
| 7 | −319.836 | 9.01 | | | 105.97 |
| 8 | 206.781 | 7.07 | 1.43387 | 95.1 | 105.28 |
| 9 | 902.408 | 0.20 | | | 104.95 |
| 10 | 165.759 | 8.02 | 1.43387 | 95.1 | 103.48 |
| 11 | 654.064 | 0.20 | | | 102.88 |
| 12 | 127.264 | 8.35 | 1.43875 | 94.7 | 99.35 |
| 13 | 366.196 | (Variable) | | | 98.48 |
| 14 | 145.267 | 1.00 | 1.88300 | 40.8 | 34.87 |
| 15 | 20.067 | 8.39 | | | 29.30 |
| 16 | −71.498 | 0.90 | 1.81600 | 46.6 | 29.32 |
| 17 | 143.171 | 0.70 | | | 29.97 |
| 18 | 64.307 | 6.39 | 1.80810 | 22.8 | 31.01 |
| 19 | −50.810 | (Variable) | | | 31.15 |
| 20 | −58.234 | 1.50 | 1.81600 | 46.6 | 29.18 |
| 21* | ∞ | (Variable) | | | 29.22 |
| 22 | −45.236 | 1.30 | 1.72916 | 54.7 | 26.09 |
| 23 | 72.150 | 3.80 | 1.84666 | 23.8 | 27.65 |
| 24 | 21853.295 | (Variable) | | | 28.37 |
| 25 | −222.662 | 4.63 | 1.60738 | 56.8 | 36.29 |
| 26 | −52.201 | 0.15 | | | 37.08 |
| 27 | 163.221 | 4.62 | 1.51823 | 58.9 | 37.99 |
| 28 | −121.111 | (Variable) | | | 38.08 |
| 29 (SP) | ∞ | 1.00 | | | 37.45 |
| 30 | 40.232 | 8.83 | 1.48749 | 70.2 | 36.93 |
| 31 | −88.682 | 1.50 | 1.80100 | 35.0 | 35.95 |
| 32 | 337.950 | 0.15 | | | 35.02 |
| 33 | 24.493 | 7.82 | 1.48749 | 70.2 | 32.87 |
| 34 | 147.581 | 1.50 | 1.88300 | 40.8 | 31.08 |
| 35 | 22.564 | 39.70 | | | 27.58 |
| 36 | 507.251 | 5.75 | 1.57501 | 41.5 | 29.74 |
| 37 | −36.972 | 0.20 | | | 29.78 |
| 38 | 113.617 | 1.20 | 1.81600 | 46.6 | 27.58 |
| 39 | 19.510 | 8.03 | 1.51742 | 52.4 | 25.54 |
| 40 | −94.000 | 0.20 | | | 25.15 |
| 41 | 26.835 | 5.65 | 1.49700 | 81.5 | 23.65 |
| 42 | −141.830 | 1.20 | 1.88300 | 40.8 | 22.22 |
| 43 | 32.898 | 1.00 | | | 20.83 |
| 44 | 19.848 | 2.86 | 1.51742 | 52.4 | 20.40 |
| 45 | 34.690 | 3.80 | | | 19.64 |
| 46 | ∞ | 33.00 | 1.60859 | 46.4 | 31.25 |
| 47 | ∞ | 13.20 | 1.51680 | 64.2 | 31.25 |
| 48 | ∞ | 8.90 | | | 31.25 |
| Image Plane | ∞ | | | | |

ASPHERIC DATA

21st Surface
k = −6.77371e+15 A 4 = −3.77917e−06 A 6 = −3.26883e−09 A 8 = −1.31120e−11

VARIOUS DATA
ZOOM RATIO 40.00

| | WIDE | MIDDLE | TELE |
|---|---|---|---|
| Focal Length | 10.00 | 14.46 | 400.00 |
| Fno | 2.10 | 2.10 | 4.00 |
| Half Angle of View (°) | 28.81 | 20.82 | 0.79 |
| Image Height | 5.50 | 5.50 | 5.50 |
| Overall Lens Length | 390.24 | 390.24 | 390.24 |
| BF | 8.90 | 8.90 | 8.90 |
| d13 | 0.48 | 26.79 | 121.54 |
| d19 | 4.06 | 6.69 | 3.80 |
| d21 | 123.36 | 91.05 | 16.94 |
| d24 | 14.95 | 17.91 | 1.80 |
| d28 | 5.61 | 6.01 | 4.37 |

-continued

| NUMERICAL EXAMPLE 5 UNIT: mm | | | |
|---|---|---|---|
| EnPP | 72.77 | 121.98 | 2342.06 |
| ExPP | −377.90 | −377.90 | −377.90 |
| FPPP | 82.51 | 135.90 | 2328.41 |
| RPPP | −1.10 | −5.56 | −391.10 |

LENS UNIT DATA

| LU | SS | FL | LCL | FPPP | RPPP |
|---|---|---|---|---|---|
| 1 | 1 | 153.00 | 62.93 | 38.89 | −4.51 |
| 2 | 14 | −54.00 | 17.37 | −9.61 | −28.95 |
| 3 | 20 | −71.01 | 1.50 | −0.00 | −0.82 |
| 4 | 22 | −68.92 | 5.10 | −0.08 | −2.88 |
| 5 | 25 | 60.94 | 9.40 | 4.18 | −1.87 |
| 6 | 30 | 81.82 | 136.58 | 65.16 | −57.82 |

Moving Amount during Focusing (where Direction from Object Side to Image Side is Positive)

| Lens Unit | Infinity | Closest Distance (3.0 m) |
|---|---|---|
| Wide-Angle End | | |
| Second Sub-Lens Unit L12 | 0.000 | −0.673 |
| Third Sub-Lens UnitL61 | 0.000 | −0.030 |
| f = 14.5 mm | | |
| Second Sub-Lens Unit L12 | 0.000 | 3.099 |
| Third Sub-Lens Unit L61 | 0.000 | −0.090 |
| Telephoto End | | |
| Second Sub-Lens Unit L12 | 0.000 | −8.114 |
| Third Sub-Lens Unit L61 | 0.000 | 0.000 |

| | | | Numerical Example | | | | |
|---|---|---|---|---|---|---|---|
| | | | 1 | 2 | 3 | 4 | 5 |
| Inequality | (1) | fg1/f1 | −1.404 | −1.411 | −1.402 | −1.624 | −1.617 |
| | (2) | \|x1w/1t\| | 0.014 | 0.063 | 0.425 | 0.075 | 0.083 |
| | (3) | \|x2t/x1t\| | 0.000 | 0.185 | 0.000 | 0.091 | 0.000 |
| | (4) | \|x1wm/x1t\| | 0.087 | 0.009 | 0.122 | 0.199 | 0.382 |
| | (5) | ft/f1 | 4.354 | 4.274 | 4.422 | 4.284 | 2.614 |
| | (6) | f1/fw | 33.176 | 33.793 | 32.666 | 29.176 | 15.300 |
| | (7) | \|βf2w\| | 0.011 | 0.006 | 0.015 | 0.326 | 0.011 |
| | (8) | f2/f34 | −0.301 | −0.294 | −0.300 | −0.341 | 2.913 |
| | (9) | f1/f2 | −11.281 | −11.444 | −11.487 | −10.213 | −2.833 |
| | | fg1 | −348.450 | −347.189 | −347.674 | −402.792 | −247.477 |
| | | f1 | 248.160 | 246.010 | 248.000 | 248.000 | 153.000 |
| | | x1w | −0.299 | 1.361 | −9.437 | −1.654 | −0.673 |
| | | x1t | −22.011 | −21.574 | −22.201 | −22.083 | −8.114 |
| | | x2t | 0.000 | −4.000 | 0.000 | −2.000 | 0.000 |
| | | fwm | 12.299 | 11.970 | 12.483 | 13.776 | 14.461 |
| | | x1wm | 1.906 | 0.196 | 2.701 | −4.405 | 3.099 |
| | | fw | 7.480 | 7.280 | 7.592 | 8.500 | 10.000 |
| | | ft | 1080.414 | 1051.446 | 1096.562 | 1062.492 | 400.000 |
| | | βf2w | 0.011 | 0.006 | 0.015 | −0.326 | 0.011 |
| | | f2 | −21.998 | −21.496 | −21.589 | −24.284 | −54.000 |
| | | f34 | 73.005 | 73.081 | 72.082 | 71.312 | −18.536 |

Image Pickup Apparatus

Figure 12:
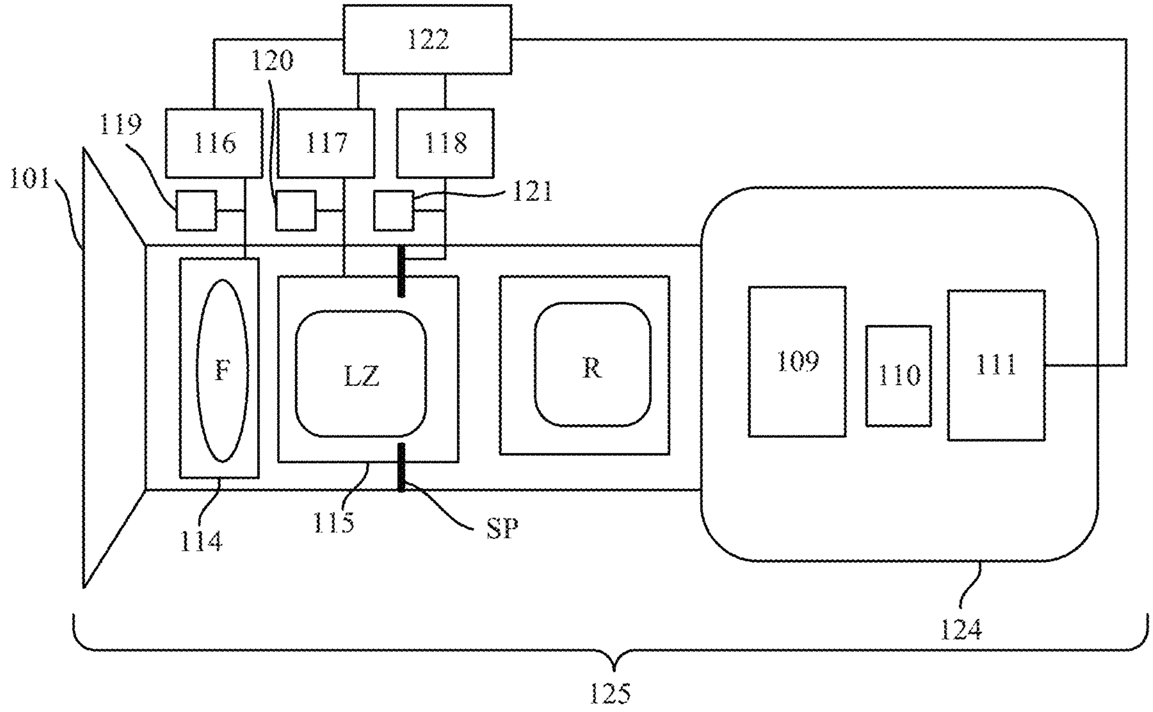
FIG. 12 is a schematic diagram of an image pickup apparatus according to each example.

FIG. 12 schematically illustrates an image pickup apparatus (television camera system) 125 that uses the zoom lens according to any one of the above examples as an imaging optical system. In FIG. 12, reference numeral 101 denotes a zoom lens according to any one of Examples 1 to 5. Reference numeral 124 denotes a camera. The zoom lens 101 is attachable to and detachable from the camera 124.

The zoom lens 101 includes a first lens unit F, a magnification varying unit LZ, and a rear group R for imaging. The first lens unit F includes one or more sub-lens units for focusing. The magnification varying unit LZ includes a plurality of lens units that move for magnification variation and a lens unit that moves to correct image plane variations associated with magnification variation. SP denotes an aperture stop.

Reference numerals 114 and 115 denote driving mechanisms such as helicoids and cams that drive the first lens unit F and the magnification varying unit LZ, respectively. Reference numerals 116 to 118 denote motors that drive the driving mechanisms 114 and 115, and the aperture stop SP, respectively. Reference numerals 119 to 121 denote detectors such as encoders, potentiometers, or photosensors for detecting the positions of the first lens unit F and magnification varying unit LZ, and the aperture diameter of the aperture stop SP.

In the camera 124, reference number 109 denotes a glass block equivalent to the optical filter or color separation optical system within the camera 124. Reference numeral 110 denotes an image sensor (photoelectric conversion element) such as a CCD sensor or CMOS sensor that receives an object image formed by the zoom lens 101. Reference numerals 111 and 122 denote CPUs that control the various types of driving of the camera 124 and the zoom lens 101.

Thus, applying the zoom lens according to any one of the above examples to the camera 124 can achieve a camera system 125 with high optical performance.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each example can provide a zoom lens that has a wide angle of view, a high zoom ratio, a reduced size and weight, and high optical performance over the entire zoom range.

This application claims priority to Japanese Patent Application No. 2023-195590, which was filed on Nov. 17, 2023, and which is hereby incorporated by reference herein in its entirety.

What is claimed is:

1. A zoom lens comprising:

a first lens unit having positive refractive power that is disposed closest to an object and does not move for magnification variation; and a second lens unit having negative refractive power that moves for magnification variation, wherein a distance adjacent lens units changes during magnification variation, wherein the first lens unit includes a first focus unit that moves for focusing, wherein the zoom lens further comprises a second focus unit that is disposed on the image side of the first lens unit and moves for focusing, and wherein the following inequalities are satisfied:

$$-1.7 \leq fg1/f1 \leq -1.0$$

$$0 \leq |x1w/x1t| \leq 0.50$$

$$0 \leq |x2t/x1t| \leq 0.25$$

where f1 is a focal length of the first lens unit, fg1 is a focal length of a lens closest to the object in the first lens unit, x1w and x1t are moving amounts for focusing from infinity to a close distance end at a wide-angle end and a telephoto end of the first focus unit, respectively, x2t is a moving amount for focusing from infinity to the close distance end at the telephoto end of the second focus unit, and a sign of each moving amount is positive when a focus unit is closer to an image plane at the close distance end than at infinity, and negative when the focus unit is closer to the object at the close distance end than at infinity.

2. The zoom lens according to claim 1, wherein the following inequality is satisfied:

$$0 \leq |x1wm/x1t| \leq 0.5$$

where fw and ft are focal lengths of the zoom lens at the wide-angle end and the telephoto end, respectively, and x1wm is a moving amount for focusing from infinity to the close distance end of the first focus unit at a focal length $fwm=fw\times(ft/fw)^{0.1}$ of the zoom lens.

3. The zoom lens according to claim 1, wherein the first focus unit moves toward an object side for focusing from infinity to the close distance end.

4. The zoom lens according to claim 1, wherein the following inequality is satisfied:

$$4.0 \leq ft/f1 \leq 6.0$$

where ft is a focal length of the zoom lens at the telephoto end.

5. The zoom lens according to claim 1, wherein the following inequality is satisfied:

$$27 \leq f1/fw \leq 40$$

where fw is a focal length of the zoom lens at a wide-angle end.

6. The zoom lens according to claim 1, wherein the lens closest to the object in the first lens unit is a biconcave lens.

7. The zoom lens according to claim 1, wherein the zoom lens includes a final lens unit that is disposed closest to the image plane and does not move for magnification variation, and wherein the second focus unit is a part of the final lens unit.

8. The zoom lens according to claim 7, wherein an extender unit can be inserted into and removed from space in the final lens unit to change a focal length range of the zoom lens toward a long focal length side.

9. The zoom lens according to claim 1, wherein the following inequality is satisfied:

$$0 \leq |\beta f2w| \leq 0.5$$

where βf2w is a lateral magnification of the second focus unit at the wide-angle end in an in-focus state at infinity.

10. The zoom lens according to claim 1, wherein the zoom lens includes, in order from an object side to the image side, the first lens unit, the second lens unit, a third lens unit having positive refractive power that moves toward the object side for magnification variation from the wide-angle end to the telephoto end, and a fourth lens unit having positive refractive power, and wherein the following inequality is satisfied:

$$-0.50 \leq f2/f34 \leq -0.15$$

where f34 is a combined focal length of the third lens unit and the fourth lens unit at the wide-angle end.

11. The zoom lens according to claim 1, wherein the following inequality is satisfied:

$$-15.0 \leq f1/f2 \leq -8.0$$

where f2 is a focal length of the second lens unit.

12. The zoom lens according to claim 1, wherein the first focus unit includes a plurality of sub-lens units that move independently of each other during focusing from infinity to the close distance end.

13. The zoom lens according to claim 1, further comprising, in order from an object side to the image side, the first lens unit, the second lens unit, a third lens unit having positive refractive power that moves toward the object side for magnification variation from the wide-angle end to the telephoto end, a fourth lens unit having positive refractive power that moves to correct image plane variation associated with magnification variation, and a fifth lens unit as a final lens unit having positive refractive power that does not move for magnification variation and includes the second focus unit.

14. The zoom lens according to claim 1, further comprising, in order from an object side to the image side, the first lens unit, the second lens unit, a third lens unit having negative refractive power that moves toward the image side for magnification variation from the wide-angle end to the telephoto end, a fourth lens unit having negative refractive power that moves for magnification variation from the wide-angle end to the telephoto end, a fifth lens unit having positive refractive power that moves to correct image plane variation associated with magnification variation, and a sixth lens unit as a final lens unit having positive refractive power that does not move for magnification variation and includes the second focus unit.

15. An image pickup apparatus comprising:

a zoom lens; and an image sensor configured to capture an object through the zoom lens, wherein the zoom lens includes:

a first lens unit having positive refractive power that is disposed closest to the object and does not move for magnification variation; and a second lens unit having negative refractive power that moves for magnification variation, wherein a distance adjacent lens units changes during magnification variation, wherein the first lens unit includes a first focus unit that moves for focusing, wherein the zoom lens further comprises a second focus unit that is disposed on the image side of the first lens unit and moves for focusing, and wherein the following inequalities are satisfied:

$$-1.7 \leq fg1/f1 \leq -1.0$$

$$0 \leq |x1w/x1t| \leq 0.50$$

$$0 \leq |x2t/x1t| \leq 0.25$$

where f1 is a focal length of the first lens unit, fg1 is a focal length of a lens closest to the object in the first lens unit, x1w and x1t are moving amounts for focusing from infinity to a close distance end at a wide-angle end and a telephoto end of the first focus unit, respectively, x2t is a moving amount for focusing from infinity to the close distance end at the telephoto end of the second focus unit, and a sign of each moving amount is positive when a focus unit is closer to an image plane at the close distance end than at infinity, and negative when the focus unit is closer to the object at the close distance end than at infinity.

* * * * *